(12) United States Patent
Fujie et al.

(10) Patent No.: US 7,309,424 B2
(45) Date of Patent: Dec. 18, 2007

(54) FILTERING APPARATUS, BACK WASH METHOD THEREFOR, FILTERING DEVICE AND POWER PLANT

(75) Inventors: Makoto Fujie, Kanagawa-ken (JP); Hideki Nakamura, Kanagawa-ken (JP); Kazuya Yamada, Tokyo (JP); Shuji Seki, Kanagawa-ken (JP); Manabu Sakurai, Kanagawa-ken (JP); Tadashi Fukushima, Tokyo (JP); Kenichiro Ide, Kanagawa-ken (JP); Tetsuya Noda, Kanagawa-ken (JP); Masaru Komatsubara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/183,173

(22) Filed: Jul. 18, 2005

(65) Prior Publication Data
US 2006/0054541 A1    Mar. 16, 2006

Related U.S. Application Data

(63) Continuation of application No. 10/059,326, filed on Jan. 31, 2002, now abandoned.

(30) Foreign Application Priority Data

| Jan. 31, 2001 | (JP) | ............................... 2001-024855 |
| Mar. 19, 2001 | (JP) | ............................... 2001-079375 |

(51) Int. Cl.
*B01D 35/02* (2006.01)
*B01D 63/02* (2006.01)
*B01D 71/32* (2006.01)
*B01D 29/66* (2006.01)

(52) U.S. Cl. .................... 210/181; 210/184; 210/411; 210/416.1; 210/435; 210/500.23

(58) Field of Classification Search ............... 210/175, 210/181, 416.1, 435, 500.23, 184, 409, 411
See application file for complete search history.

(56) References Cited

U.S. PATENT DOCUMENTS

| 3,969,285 | A | | 7/1976 | Grot |
| 4,399,035 | A | | 8/1983 | Nohmi et al. |
| 4,681,605 | A | * | 7/1987 | Gollan ......................... 96/13 |
| 4,732,586 | A | | 3/1988 | Dick et al. |
| 4,810,384 | A | | 3/1989 | Fabre |
| 5,110,478 | A | | 5/1992 | Haag et al. |
| 5,152,894 | A | * | 10/1992 | Haubs et al. .......... 210/500.38 |
| 5,240,610 | A | | 8/1993 | Tani et al. |
| 5,244,578 | A | * | 9/1993 | Ohnishi et al. .............. 210/650 |
| 5,279,856 | A | | 1/1994 | Koyama et al. |
| 5,403,483 | A | * | 4/1995 | Hayashida et al. ......... 210/490 |

(Continued)

FOREIGN PATENT DOCUMENTS

CA    1042314 A    5/1990

(Continued)

*Primary Examiner*—Fred G. Prince
(74) *Attorney, Agent, or Firm*—Foley & Lardner LLP

(57) ABSTRACT

A filtering apparatus having a vessel and a filter made from fluororesin and treated before filtering operation by at least one of adding thermal treatment in gas or liquid and penetrating with fluid composed of hot water or steam at a temperature of less than melting point of the fluororesin.

17 Claims, 12 Drawing Sheets

U.S. PATENT DOCUMENTS

| | | | |
|---|---|---|---|
| 5,965,027 A * | 10/1999 | Allen et al. | 210/638 |
| 5,976,380 A | 11/1999 | Moya | |
| 6,077,435 A | 6/2000 | Beck et al. | |
| 6,321,915 B1 | 11/2001 | Wilson et al. | |
| 6,354,443 B1 | 3/2002 | Moya | |
| 6,402,951 B1 | 6/2002 | Wilson et al. | |

FOREIGN PATENT DOCUMENTS

| | | |
|---|---|---|
| EP | 0 598 908 A1 | 6/1994 |
| EP | 0 862 022 A2 | 9/1998 |
| FR | 2093373 | 1/1972 |
| JP | 44-005526 A1 | 3/1944 |
| JP | 56-040602 A2 | 9/1981 |
| JP | 58-051906 A | 3/1983 |
| JP | 60-061018 A | 4/1985 |
| JP | 60-209205 A | 10/1985 |
| JP | 62-160109 A | 7/1987 |
| JP | 04-187224 A | 7/1992 |
| JP | 05-057153 A | 3/1993 |
| JP | 06-106034 A | 4/1994 |
| JP | 10-192605 A | 7/1998 |
| JP | 10-192853 A | 7/1998 |
| JP | 10-339793 A | 12/1998 |
| JP | 11-042424 A | 2/1999 |
| JP | 2993217 B2 | 10/1999 |
| JP | 2000-084377 A | 3/2000 |
| JP | 2000-140531 A | 5/2000 |
| JP | 2000-185222 A | 7/2000 |

* cited by examiner

FILTERING APPARATUS, BACK WASH METHOD THEREFOR, FILTERING DEVICE AND POWER PLANT

CROSS-REFERENCE TO RELATED APPLICATIONS

The present application is a continuation of U.S. application Ser. No. 10/059,326, filed Jan. 31, 2002 now abandoned, the entire contents of which is incorporated herein by reference.

This application is based upon and claims the benefit of priority from the prior Japanese Patent Applications No. 2001-24855 filed on Jan. 31, 2001, and No. 2001-79375 filed on Mar. 19, 2001, the entire contents of which are incorporated herein by reference.

BACKGROUND OF THE INVENTION

1. Field of the Invention

This invention relates to a filtering apparatus and a filtering device for removing suspended solid contained in hot water and a power plant in which the filtering apparatus or the filtering device is installed.

2. Description of the Related Art

Conventionally, in a case of removing suspended solid generated from structural material or piping material by a condenser in a power plant, especially removing iron oxide, hollow fiber filter apparatus made from polyethylene is used before heating feedwater. Moreover, for removing suspended solid in hot water after heating feedwater, a metallic filter or an electromagnetic filter, etc., is used. For example, it is shown in Japanese Patent Disclosure (Koukai) No. H10-339793.

However, by using a filtering apparatus with the filter mentioned above, although a filter or a filtration material which has the mechanism to reduce concentration of the suspended solid is installed for suppressing prevention of heat transmission and corrosion inside of piping, since heat-resistant temperature of the above-mentioned hollow fiber filter apparatus made from polyethylene is about 60 degrees Centigrade, it cannot be applied to a feedwater heater. In addition, the suspended solid which exists in feedwater is also generated in the feedwater heater.

Moreover, a metal filter has subjects that it is chemically unstable, and a used metallic material may begin to dissolve and corrode or form an oxide film, and thus pores of the filter may be blocked. Furthermore, an electromagnetic filter has deferrization performance that is greatly influenced by quality of the suspended solid.

In regard to a general heat-resistant filter module composed of a hollow porosity film, a manufacturing method composed of pouring resins of low viscosity, such as an epoxy resin, a urethane resin, and a silicone resin, into the gap of an outer case and the hollow porosity film and heating the resin to harden is learned. For example, it is shown in Japanese Patent Publication (Koukoku) No. S44-5526, and Japanese Patent Publication (Koukoku) No. S56-40602.

However, even if the hollow porosity film itself is a material having sufficient performance from a viewpoint of heat-resistance and elution, the amount of elution from these resins used as an encapsulant is large and inadequate, and it is difficult to apply these resins to a filter for removing suspended solid from hot water in the temperature of over 100 degrees Centigrade, such as feedwater or heater drain of a power plant whose water quality is highly managed.

In order to solve this problem, it is proposed a method of manufacturing a filter module, with heat-resistance and little elution, made from only fluororesin as the hollow porosity film and to seal the hollow porosity filter with a thermoplastic fluororesin. For example, it is shown in Japanese Patent Publication (Touroku) No. 2993217.

FIG. 21 is a sectional view showing an example of a seal portion of a filter module of the hollow porosity film obtained by the above-mentioned conventional method.

As shown in FIG. 21, in a filter module 104 of the hollow porosity film, a hollow porosity film 102 made from polytetrafluoroethylene (PTFE), which is a kind of fluororesin, is settled inside of an outer case 101 and sealed with polytetrafluoroethylene-hexafluoropropylene copolymer (FEP) to form a support portion 103 of FEP. The outer case 101 can be made from metals, such as stainless steel, PTFE, FEP, etrafluoroethylene-perfluoroalkylvinylether copolymer (PFA), etc. FEP and PFA of fluororesins are suitable for a thermoplastic resin which can be used as an encapsulant.

By this method, since a filter module can be composed of metal and fluororesin only, or fluororesin only, from a viewpoint of necessary condition of heat-resistance and elution required as a filter for dissociating suspended solid contained in the hot water of a power plant, this filter is improved rather than a conventional filter having the above-mentioned problem.

By the way, in order to prevent lowering of heat-conductivity by extraction and precipitation of suspended solid or a dissolution component contained in water to piping, or to prevent vibration of a pump, in the above-mentioned conventional power plant, a filtering apparatus or a desalination equipment is installed to remove suspended solid and ions in the water.

By installing a filtering apparatus composed of the above-mentioned filter made from polyethylene, suspended solid in condensate at low temperature can be removed, however, the filter made from polyethylene is not applicable for removing suspended solid generated in hot water at a temperature of not less than 100 degrees Centigrade because heat-resistant temperature of the polyethylene filter is low.

Moreover, the metallic filter applied to feedwater at a temperature of over 100 degrees Centigrade tends to be chemically unstable and clogged up with deposit of solid substances, and it may pollute water by elution from the filter material in view of standard water quality control, therefore applying the metallic filter to hot water is difficult.

On the other hand, the electromagnetic filter has low filtering performance because it can remove only magnetized suspended solid, and it is difficult for the electromagnetic filter to reproduce the filter for removing dissociated suspended solid.

Furthermore, the filter shown in FIG. 21 cannot avoid heat cycles for treating hot water of a power plant, and the filter module 104 tends to be damaged due to expansion and contraction and exfoliation of the outer case 101 and the support portion 103, because of differences of their materials and their thermal expansion coefficients.

Moreover, in a filter applied as an object for condensate filtering, back wash operation to reproduce hollow fibers which constitute the filter is performed. In this case, by using a fact that gas cannot pass through the film at a pressure which is lower than a bubble point, which is the minimum pressure at which the gas can pass through the film, a method of removing suspended solid deposited on a surface of the film by pressing at certain pressure which is lower than the bubble point to push out water in the upper space of the filtering apparatus is adopted.

On the other hand, a hydrophobic filter applied to such as a power plant must be made hydrophilic by using alcohol, etc. before use. Although the above-mentioned conventional method of back wash can be applied if the bubble point is more than the pressure at the back wash process, if packed material or a film constituting the filter has low bubble point, passing through gas in back wash makes it hydrophobic and thus it needs to be made hydrophilic. Moreover, purification process of the system takes additional time and medical fluid processing is also necessary.

Moreover, the back wash process of the filter used at high temperature cannot be carried out at the high temperature, so it needs cooling process before the back wash process and heating process before restarting. Therefore, it needs to be furnished for cooling and heating, and it additionally takes long time to restart the filter because long cooling time and long heating time is included.

In the above-mentioned conventional filtering apparatus, there are several awaiting solution. That is, the hollow fiber filter made from polyethylene cannot be applied to a feedwater heater because its heat-resistant temperature is about 60 degrees Centigrade, and the metal filter is chemically unstable and its used metallic material dissolves and its pores may be blocked due to corrosion in proportion to forming an oxide film, and the electromagnetic filter has deferrization performance that is greatly influenced by quality of the suspended solid.

Furthermore, the filter shown in FIG. 21 cannot avoid heat cycles for treating hot water of a power plant, and the hollow porosity film 102 tends to be damaged due to expansion and contraction of the outer case 101 and the support portion 103 whose thermal expansion coefficients differ each other, and thus pollution of water quality is occurred due to the base of the filter. And it is difficult to reproduce the filter, thus it is difficult to use as a filter for removing suspended solid contained in hot water of a power plant in which highly management of water quality and long-term stable performance are needed.

And in the conventional back wash method of a filtering apparatus, if the bubble point of packed material or a film constituting the filter is low, making the filter hydrophilic is necessary because passing gases in the back wash process makes the filter hydrophobic. And excessive purification process of the system and medical fluid processing are also needed.

Moreover, it needs cooling before the back wash process and heating before restarting because it cannot back wash the filter used in high temperature circumstance without cooling, so it needs time and additional facilities for cooling and heating and it takes long time up to restarting.

Recently it is found that fluororesin is chemically stable under hot water especially with the temterature of over 150 degrees Centigrade. However, since the fluororesin filter is manufactured by pulling filter base element, if the fluororesin filter contacts with hot water in filtering operation, the fluororesin filter tends to deformed and the permeability of the fluororesin is lowered and damaged because of heat cycle.

SUMMARY OF THE INVENTION

Accordingly, an object of this invention is to provide a filtering apparatus which is chemically stable and a back wash method for a filtering apparatus, for removing suspended solid contained in hot water properly without considering elution from the filter, for satisfying water quality control because the amount of the elution is little, and for preventing damages of the filter and lowering of permeability of the filter because of the heat cycle.

Another object of this invention is to provide a filtering device which does not need complex system and additional process to make the filter hydrophilic in every back wash operation, for back washing at high temperature and with convenient system structure.

Still another object of this invention is to provide a power plant for removing the suspended solid contained in hot water such as feedwater or heater drain by applying the above-mentioned filtering apparatus or filtering device.

Additional purposes and advantages of the invention will be apparent to persons skilled in this field from the following description, or may be learned by practice of the invention.

According to an aspect of this invention, there is provided a filtering apparatus including, a vessel adapted for connecting a feed inlet line for introducing feed into the vessel and a filtrate outlet line for letting filtrate flow out of the vessel, a filter contained in the vessel for filtering the feed to let filtered feed flow as the filtrate, and the filter being made of fluororesin to which thermal treatment is added beforehand by at least one of heating the filter in at least one of gas and liquid and penetrating the filter through permeation fluid composed of at least one of hot water and steam.

According to an aspect of this invention, there is provided a method of manufacturing a filtering apparatus, including, making a filter for filtering feed from fluorotesin, adding thermal treatment to the filter by at least one of heating the filter in at least one of gas and liquid and penetrating the filter through permeation fluid composed of one of hot water and steam, and after the adding of thermal treatment to the filter arranging the filter in a vessel adapted for connecting a feed inlet line for introducing the feed into the vessel and a filtrate outlet line for letting filtrated feed flow as filtrate out of the vessel.

According to another aspect of this invention, there is provided a back wash method for back washing a filtering apparatus composed of a vessel and a filter made from fluororesin to which thermal treatment is added by using at least one of gas and liquid beforehand, the vessel being composed of a first compartment in which the filter is contained to filter feed in a filtering operation and a second compartment positioned above the first compartment to contain filtered feed as filtrate in the filtering operation, the back wash method including, first back washing the filter composed of, supplying back wash rinse fluid composed of at least one of water, air and steam into the filtering apparatus from the second compartment side of the filtering apparatus, passing the back wash rinse fluid through the filter, and discharging the back wash rinse fluid out of the filtering apparatus; and second back washing the filter composed of, supplying back wash water into the filtering apparatus from the first compartment side of the filtering apparatus, passing the back wash water through the filter, and discharging the back wash water out of the filtering apparatus from the second compartment side of the filtering apparatus.

According to another aspect of this invention, there is provided a filtering device including, a filtering apparatus composed of a vessel with a filtrate accumulation space provided in an upper side thereof and a filter contained in the vessel, a feed inlet line for introducing feed into the filtering apparatus, a filtrate outlet line for letting filtrate flow out of the filtering apparatus, the filter filtering the feed to let filtered feed flow as the filtrate, a back wash tank for storing back wash water to be supplied into the filtering apparatus with a partition which easily passes liquid component and hardly passes gas component to separate the back wash tank into a first compartment and a second compartment, the first compartment being adapted for connecting a gas supply line capable of controlling gas pressure and for supplying the gas to the filtering apparatus, and a make-up water supply line for supplying the back wash water to the filtering apparatus, and the second compartment being connected to the filtrate accumulation space of the filtering apparatus.

According to still another aspect of this invention, there is provided a filtering device including, a filtering apparatus composed of a vessel with a filtrate accumulation space provided in an upper side thereof and a filter contained in the vessel, a feed inlet line for introducing feed into the filtering apparatus, a filtrate outlet line for letting filtrate flow out of the filtering apparatus, the filter filtering the feed to let filtered feed flow as the. filtrate, a drain line for discharging fluid in a lower side of the filtering apparatus out of the filtering apparatus from an inlet side of the feed, and a cooler installed in the drain line for cooing the discharging fluid.

According to still another aspect of this invention, there is provided a power plant including, a steam generator for generating steam from feedwater, a turbine driven by the steam supplied from the steam generator, a condenser for condensing the steam extracted from the turbine into condensate, a feedwater line for supplying the condensate from the condenser to the steam generator as the feedwater, a heater for heating the feedwater flowing in the feedwater line, a heater drain line for supplying drain discharged from the heater to the feedwater line, and any of the above-mentioned filtering apparatus and the above-mentioned filtering device installed in at least one of the feedwater line and the heater drain line.

BRIEF DESCRIMINATION OF THE DRAWINGS

A more complete appreciation of the invention and many of the attendant advantages thereof will be readily obtained as the same becomes better understood by reference to the following detailed description when considered in connection with the accompanying drawings wherein:

FIG. 2A shows an example that the hollow fluororesin filter is installed in the shape of character U, and FIG. 2B shows an example that the hollow fluororesin filter is installed in the shape of character I;

DETAILED DESCRIPTION OF THE INVENTION

Figure 1:
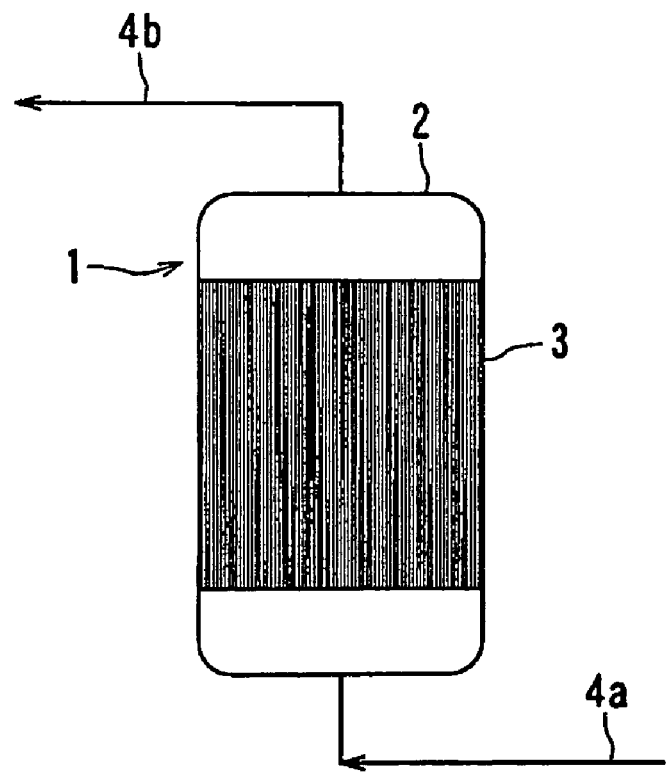
FIG. 1 is a basic block diagram showing a filtering apparatus of a first embodiment of this invention.

Referring now to the drawings, wherein like reference numerals designate identical or corresponding parts throughout the several views, the embodiments of this invention will be described below.

First Embodiment

FIG. 1 is a basic block diagram showing a filtering apparatus of a first embodiment of this invention. As shown in FIG. 1, a filtering apparatus 1 has a tank 2 as a vessel having a filter 3 made of fluororesin inside, and feed inlet line 4a into which feed flows is connected to the bottom of the tank 2, and filtrate outlet line 4b from which filtrate is discharged is connected to the upper part of the tank 2. Here, the feed is a solution before filtering operation by the filter 3, and the filtrate is filtered feed by the filter 3.

The feed inlet line 4a is, for example, a feedwater line which connects a condenser of a power plant to a reactor pressure vessel or a steam generator (not illustrated), which contains suspended solids, such as iron, during water feeding.

Moreover, the fluororesin filter 3 made of a polytetrafluoroethylene (PTFE) resin is formed in hollow shape or the shape of pleats, and a plurality of pores whose diameter are in the range between 0.01 micrometer and 5 micrometer are made on the surface of the filter 3. In addition, more preferable range of the diameter is between 0.05 micrometer and 0.45 micrometer.

Furthermore, the fluororesin filter 3 is a filter to which thermal treatment for 1 hour or more in hot water or gas at a temperature of exceeding or near the service temperature of the fluororesin filter 3 is added beforehand.

Figure 2A:
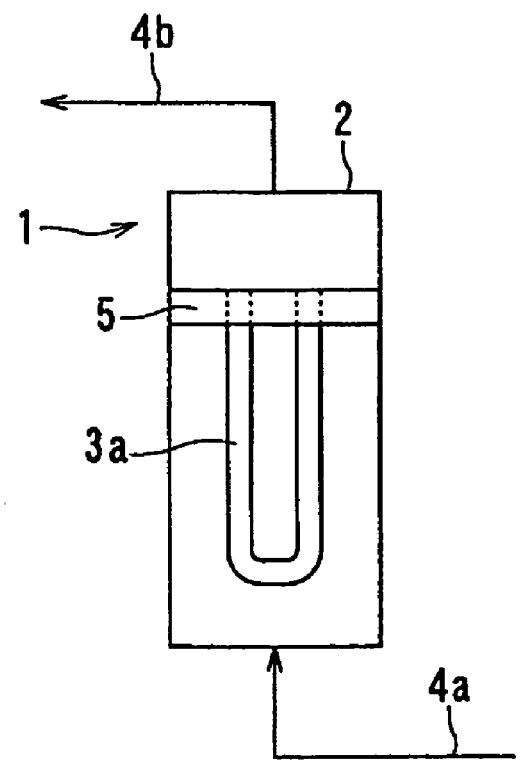
FIGS. 2A and 2B are basic block diagrams showing examples of this embodiment while the fluororesin filter 3 is formed in hollow shape installed in the tank 2.
Figure 2B:
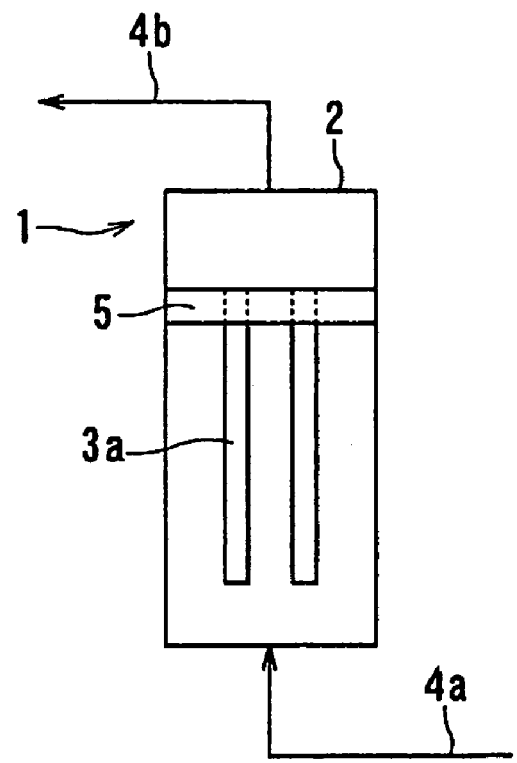

FIGS. 2A and 2B are basic block diagrams showing examples of this embodiment while the fluororesin filter 3 is formed in hollow shape installed in the tank 2. FIG. 2A shows an example that the hollow fluororesin filter is installed in the shape of character U, and FIG. 2B shows an example that the hollow fluororesin filter is installed in the shape of character I.

In FIG. 2A, the hollow fluororesin filter 3a is installed in the shape of character U by the both ends of the hollow fluororesin filter 3a being held by a seal portion 5.

And in FIG. 2B, the hollow fluororesin filter 3a is installed in the shape of character I by the end of the hollow fluororesin filter 3a being held by a seal portion 5.

The seal portion 5 holding the hollow fluororesin filter 3a is arranged at the upper part in the tank 2, it has a function as a diaphragm of the feed and the filtrate. The material of the seal portion 5 is chosen from materials which have durability in high temperature water, for example, stainless steel or tetrafluoroethylene-hexafluoropropylene copolymer resin (FEP), or tetrafluoroethylene-perfluoroalkylvinylether copolymer resin (PFA).

Figure 3:
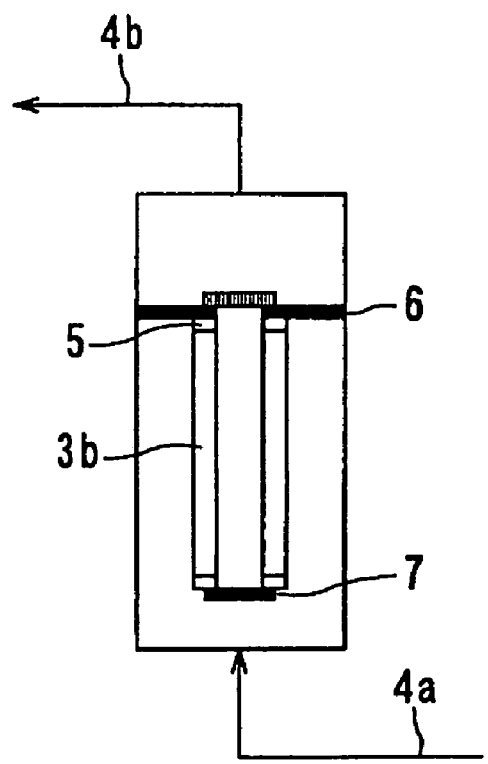
FIG. 3 is a basic block diagram showing an example of this embodiment while the fluororesin filter installed in the tank is formed in the shape of pleats.

FIG. 3 is a basic block diagram showing an example of this embodiment while the fluororesin filter installed in the tank 2 is formed in the shape of pleats. As shown in FIG. 3, the pleats-type fluororesin filter 3b is fixed by one end of the filter 3b being held by a seal portion 5, and another end of the-filter 3b being fixed by a pleats-type filter fixing plate 7 supported by a pleats-type filter support plate 6.

Next, a function of this embodiment is explained. For example, feed discharged from a condenser of a power plant flows in the tank 2 through the feed inlet line 4a, and in this tank 2, the feed is filtrated with the fluororesin filter 3, which is similar for the hollow fluororesin filter 3a or the pleats-type fluororesin filter 3b.

Here, since many pores of the diameter between 0.01 micrometers and 5 micrometers are arranged on the fluororesin filter 3, a suspended solid component whose diameter is more than the diameter of the pore is collected on the surface of the fluororesin filter 3. Thus, the filtrate is supplied to a feedwater line (not illustrated) through the filtrate outlet line 4b from the upper part of the tank 2.

Thus, according to the filtering apparatus 1 of this embodiment, by arranging the filter 3 made of fluororesin which filtrates the feed in the tank 2, it is durable under hot water, and suspended solid contained in the hot water, especially at a temperature of exceeding 150 degrees Centigrade, can be removed certainly.

For example, if the fluororesin filter is added thermal treatment by soaking the filter in hot water at a temperature of 200 degrees Centigrade before filtering operation, the concentration of fluorine which elutes from the fluororesin is not exceeding 100 ppt, which is not in the extent causing corrosion of piping components, thus the water quality of the filtrate can be kept adequate, and the suspended solid can be reduced.

Moreover, by using a heat-treated filter which is heated in hot water or gas at a temperature of exceeding or near the service temperature for 1 hour or more as the fluororesin filter 3, it can reduce impurities which elute from the filter material and keep adequate water quality of the filtrate.

In addition, though in this embodiment tetrafluoroethylene resin is used as a material of the fluororesin filter 3, fluororesins other than this can be applied.

Second Embodiment

Figure 4:
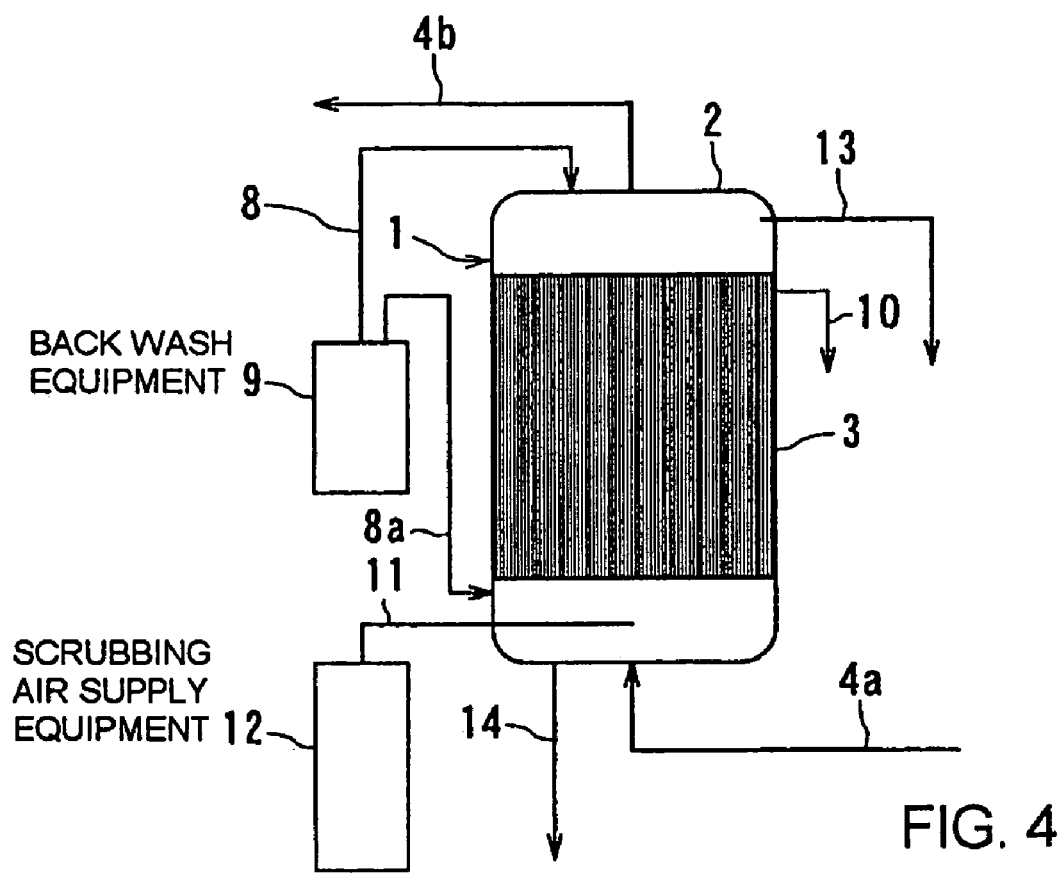
FIG. 4 is a basic block diagram showing a filtering apparatus of a second embodiment of this invention.

FIG. 4 is a basic block diagram showing a filtering apparatus of a second embodiment of this invention. In this embodiment, while using the reference number same used in the above-mentioned first embodiment to an identical or corresponding portion of the first embodiment, only different composition and different effect from the above-mentioned first embodiment are explained. And in this embodiment, inside structure of a tank 2 in this embodiment is the same as the above-mentioned first embodiment.

In this embodiment, in order to remove suspended solid adhering to surface of the fluororesin filter 3, back wash equipment which enables back wash operation by using back wash rinse fluid composed of at least one of water, air, and steam, is installed.

That is, as shown in FIG. 4, one end of a back wash line 8 for sending back wash rinse fluid into the tank 2 is connected to the upper part of the tank 2, and the other end of the back wash line 8 is connected to a back wash equipment 9. A back wash line 8a connects the lower part of the tank 2 to the back wash equipment 9. And a fluid discharge line 10 for discharging the back wash rinse fluid, etc., out of the tank 2 is connected to one compartment under filtrate accumulation space that is in the upper part of the tank 2.

Moreover, at the lower part of the tank 2, one end of a scrubbing air supply line 11 for supplying scrubbing air to the tank 2 is prolonged to the inside of the tank 2, and a scrubbing air supply equipment 12 is connected to the another end of the scrubbing air supply line 11.

And a fluid discharge line 13 for discharging fluid in the filtrate accumulation space of the tank 2 is connected to the upper part of the tank 2, and a drain line 14 for discharging suspended solid that precipitates at the bottom of the tank 2 is connected to the bottom of the tank 2.

Next, a function of this embodiment is explained. Suspended solid contained in feed adheres to the surface of the fluororesin filter 3. If the filtering process is continued without removing the suspended solid, since pressure loss inside of the tank becomes large, the pressure balance between at the entrance part of the tank 2 and at the exit part of the tank 2 becomes large, which blocks flow of the feed, therefore, the amount of filtration per unit period and filtering efficiency become to lower. Moreover, a part of suspended solid is pushed away and becomes a factor to worsen the water quality at the exit part of the tank 2.

Then, in order to keep the flow rate and water quality of the filtrate adequate, it is necessary to stop pouring the feed through the filtering apparatus 1 at the time the pressure balance is reached to a predetermined level, and afterward to remove the suspended solid adhered to the surface of the fluororesin filter 3 by using the back wash rinse fluid such as water, air, and steam.

The filtering apparatus 1 is separated into a first compartment to contain feed to be filtered by the filter 3 in the filtering operation and a second compartment, which is above the first compartment, to contain filtrate in the filtering operation. In this embodiment, two back wash operations described below are carried out toward the filtering apparatus 1 with the above-mentioned composition by stopping the filtering operation.

That is, after stopping pouring the feed from the feed inlet line 4a to the tank 2 by closing a valve (not illustrated) installed in the feed inlet line 4a, as a first back wash operation, back wash rinse fluid composed of at least one of water, air, and steam is supplied into the second compartment side of the tank 2 from the back wash equipment 9 through the back wash line 8, thus the supplied rinse fluid runs through the fluororesin filter 3 in the first compartment side and is discharged through the fluid discharge line 10 with accompanying the suspended solid which adhered to the surface of the fluororesin filter 3. By this first back wash operation, the suspended solid, which adhered to the surface of the fluororesin filter 3, is removed.

Moreover, as a second back wash operation, back wash water is supplied into the first compartment side of the tank 2 through the back wash line 8a from the back wash equipment 9, and passed through the fluororesin filter 3, and the supplied water is discharged through the fluid discharge line 13 or the filtrate outlet line 4b of the first compartment side of the tank 2. At this moment, the inflow amount is arranged so that generated pressure difference between the first compartment side and the second compartment side in the tank 2 is more than bubble point of the fluororesin filter 3. The bubble point is a necessary pressure difference between the first compartment and the second compartment for ventilating air through a film of the filter 3 when the film is damped with alcohol. By adjusting the flow of the back wash water so that the pressure difference is not less than the bubble point of the filter 3 by relatively increasing the pressure of the upstream water, that is, the pressure of the first compartment, it makes easier to flow the water from the first compartment side to the second compartment side, and the second back wash operation is properly carried out.

Moreover, by experiments for the fluororesin filter 3 whose bubble point is 0.1 MPa, it is confirmed that by setting the pressure difference between the first compartment and the second compartment to not less than 0.2 MPa, the proper second back wash operation can be carried out remarkably. Thus it is more preferable that the pressure difference is more than twice as large as the bubble point.

This second back wash operation can recover the permeability that tends to lower. Moreover, soundness of the fluororesin filter can be confirmed.

It is preferable that the second back wash operation is carried out after the first back wash operation, and it is more preferable that a scrubbing operation, which is explained below, is additionally carried out after the first back wash operation and before the second back wash operation.

That is, as the scrubbing operation, scrubbing air is supplied into the tank 2 through the scrubbing air supply line 11 from the scrubbing air supply equipment 12 and discharged through the fluid discharge line 10, therefore the fluororesin filter 3 fluctuates and then suspended solid adhered to the surface of the fluororesin filter 3 is removed by the shaking of the filter. And the suspended solid removed from the surface of the fluororesin filter 3 and precipitated at the bottom of the tank 2 is discharged through the drain line 14.

In addition, in this embodiment, both hollow-like fluororesin filter 3a and pleats-type fluororesin filter 3b are applicable. Moreover, it is also applicable to install chemical wash equipment for cleaning the filter with chemicals instead of the back wash equipment 9 in this embodiment. The chemicals used in this chemical wash equipment are, for example, hydrogen peroxide, or acid such as hydrochloric acid, sulfuric acid, nitric acid, and oxalic acid, or alkali such as sodium hydroxide.

Thus, according to this embodiment, by back wash the fluororesin filter 3 by the back wash equipment 9, or by cleaning the fluororesin filter 3 by the chemical cleaning equipment, stains caused by the suspended solid which adhered the surface of the fluororesin filter 3 can be removed. Moreover, the suspended solid which loosely adhered to the surface of the fluororesin filter 3 can be removed by the back wash equipment 9 which uses the back wash rinse fluid or the chemical wash equipment or the scrubbing air supply equipment 12. Thus, the fluororesin filter 3 can be reused without exchange, and water quality of the filtrate can be kept adequate.

Third Embodiment

Figure 5:
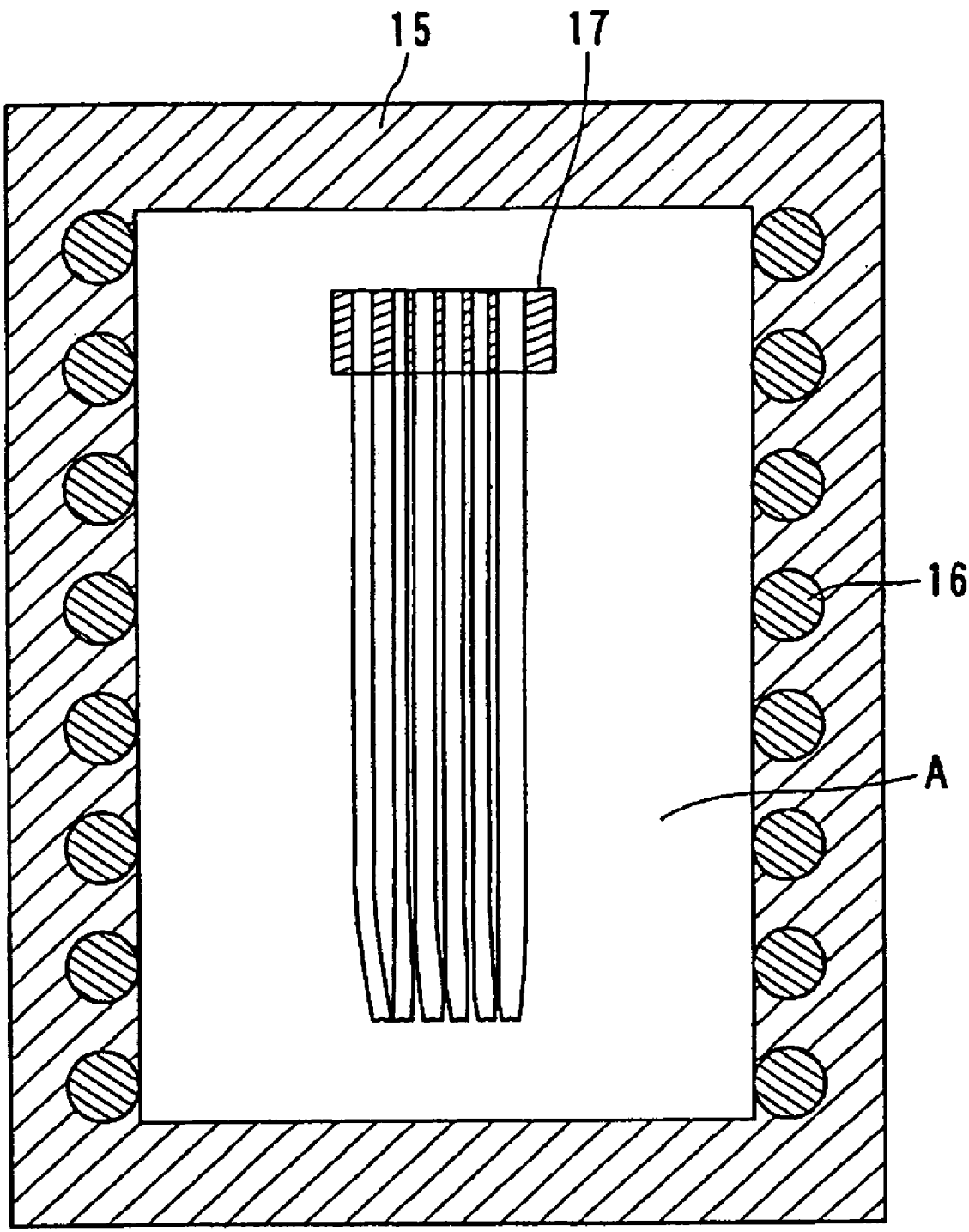
FIG. 5 is a basic cross sectional view of a preparing equipment of a filter module of a filtering apparatus of a third embodiment of this invention.

FIG. 5 is a basic cross sectional view of a preparing equipment of a filter module of a filtering apparatus of a third embodiment of this invention.

As shown in FIG. 5, a heater 16 is buried or installed in the vertical direction in a sealed hollow heat treatment vessel 15, and inside of the heat treatment vessel 15 is filled with air A. A filter module 7 made from PTFE, which is a kind of a fluororesin, is contained in the heat treatment vessel 15, and the filter module 7 is heated as the internal air A is heated by the heater 6.

Figure 6:
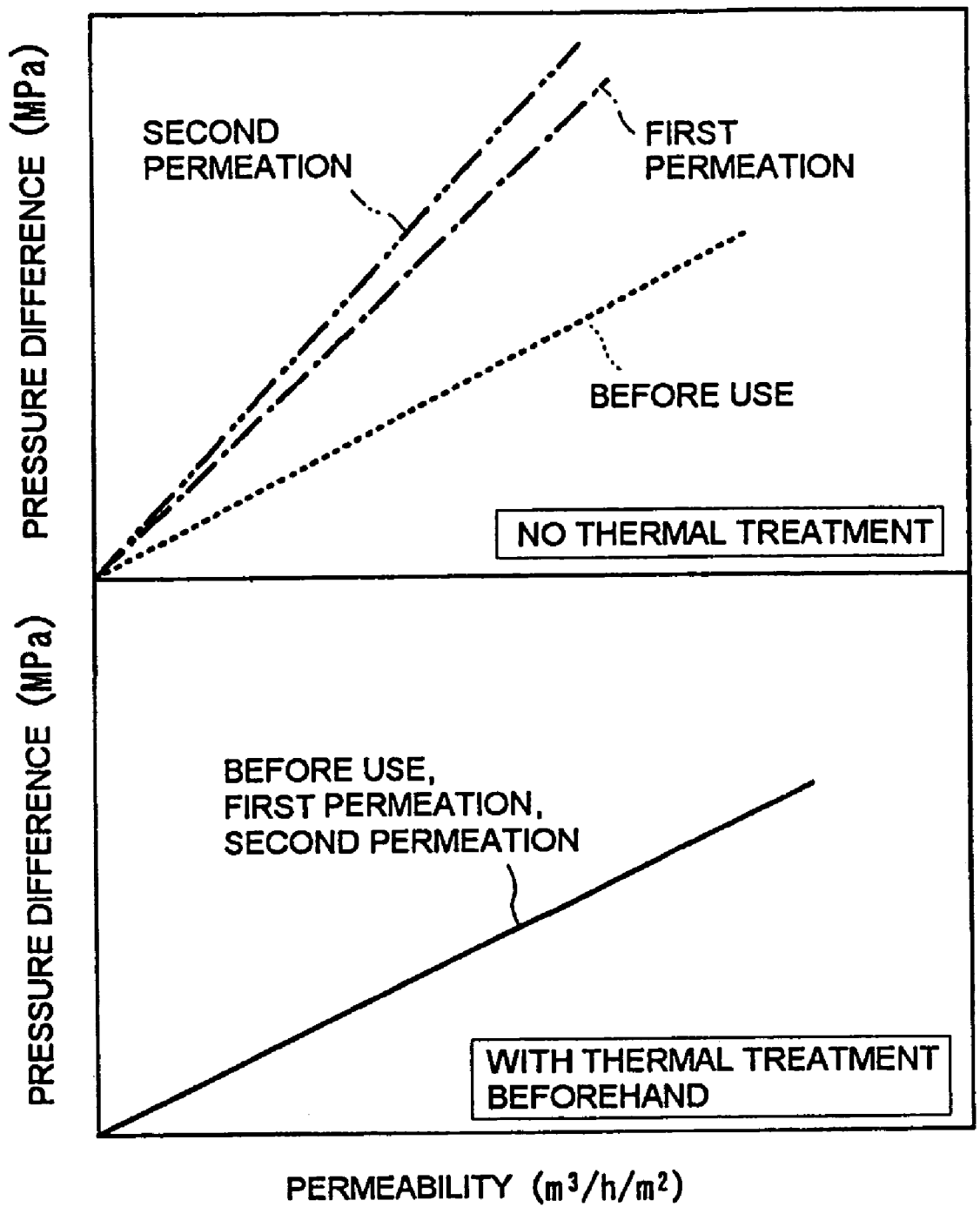
FIG. 6 is a graph showing relation between the pressure difference and the permeability concerning a filter penetrating hot water without thermal treatment of the filter module and a filter penetrating hot water with heated holding for 1 hour in an atmosphere (air A) at a temperature of 200 degrees Centigrade by using the preparing equipment shown in FIG. 5.

FIG. 6 is a graph showing relation between the pressure difference and the permeability concerning a filter penetrating hot water without thermal treatment of the filter module and a filter penetrating hot water with heated holding for 1 hour in an atmosphere (air A) at a temperature of 200 degrees Centigrade by using the preparing equipment shown in FIG. 5.

As shown in FIG. 6, the filter module 17 from which the residual stress is removed by thermal treatment in air beforehand for suppressing heat modification at the time of hot water permeation has no change in the permeability even if the hot water permeation is carried out repeatedly, so fluorine which elutes from PTFE is reduced. As shown in Example 1 of Table 1, the value 100 designates a reference point of the permeability and the amount of elution of the fluororesin in this case.

Moreover, the following Table 1 shows about a filter module which is held and prepared in inert gas at 100 degrees Centigrade for 2 hours as an Example 2, a filter module which is held and prepared in inert gas at 250 degrees Centigrade for 1 hour as an Example 3, a filter module which is held and prepared in pure water at 150 degrees Centigrade for 1 hour as an Example 4, a filter module which is held and prepared in pure water at 200 degrees Centigrade for 1.5 hours as an Example 5, and a filter module which is held and prepared in pure water at 250 degrees Centigrade for 1 hour as an Example 6.

On the other hand, the following Table 1 also shows a filter module which is held and prepared in inert gas at 90 degrees Centigrade for 2 hours as a Comparison Example 1, a filter module which is held and prepared in inert gas at 100 degrees Centigrade for 8 hours as a Comparison Example 2, and a filter module which is held and prepared in pure water at 250 degrees Centigrade for 0.9 hour as a Comparison Example 3.

In addition, in the following Table 1, it is preferable that the ratio of the permeability is not less than 100, which is a reference point, and it is allowable that the ratio of the amount of elution are no more than 130.

TABLE 1

| | | HEAT TREATMENT CONDITION | | | | |
|---|---|---|---|---|---|---|
| FILTER NUMBER | | TEMPERATURE (CENTIGRADE) | TIME (HOUR) | ATMOSPHERE | PERMEABILITY* | ELUTION AMOUNT* |
| EXAMPLES | 1 | 200 | 1 | AIR | 100 | 100 |
| | 2 | 100 | 2 | INERT GAS | 100 | 120 |
| | 3 | 250 | 1 | INERT GAS | 180 | 80 |
| | 4 | 150 | 1 | PURE WATER | 150 | 110 |
| | 5 | 200 | 1.5 | PURE WATER | 150 | 90 |
| | 6 | 250 | 1 | PURE WATER | 170 | 80 |
| COMPARISON EXAMPLES | 1 | 90 | 2 | INERT GAS | 40 | 130 |
| | 2 | 100 | 0.8 | INERT GAS | 65 | 140 |
| | 3 | 250 | 0.9 | PURE WATER | 180 | 135 |

*100 AS A REFERENCE POINT

Clearly recognized from FIG. 6 and Table 1, as shown in Examples 1 through 6, if the filter is heated for 1 hour or more in air atmosphere or pure water at a temperature of between 100 and 250 degrees Centigrade, which is below the melting point of PTFE (327 degrees Centigrade) for removing residual stress and suppressing the heat modification before use of the filter, the permeability of the filter is improved and the amount of elution of the fluororesin is reduced.

On the other hand, as shown in Table 1, if the temperature of the heat treatment is set under 100 degrees Centigrade, the quantity of fluorine which elutes from the fluororesin increases, and the permeability is markedly lowered as shown in Comparison Example 1. And if the temperature of the heat treatment is 100 degrees Centigrade and the retention time is less than 1 hour, the quantity of fluorine which elutes from the fluororesin increases, and the permeability is markedly lowered as shown in Comparison Example 2. Moreover, if the temperature of the heat treatment is 250 degrees Centigrade and the retention time is less than 1 hour, though the permeability improves, the quantity of fluorine which elutes from the fluororesin increases as shown in Comparison Example 3.

Therefore, as shown in FIG. 6, by using the filter module which has not heated, the film of the filter is deformed by the residual stress at the time of manufacture and the permeability is lowered, at every hot water permeation.

By the filter module 17 obtained according to the Examples 1 through 6, the filter module 17 has stable heat-resistant cycle performance in applying to a filtering apparatus which has frequent heat cycles of such as heater drain and feedwater, by thermal treatment beforehand to remove the residual stress at the time of manufacture.

In addition, it takes 1 hour or more to raise the temperature in the heat treatment vessel 15 to set the temperature at the above-mentioned processing temperature, and after holding at the constant temperature for 1 hour or more and removing the residual stress, it is gradually cooled for from 3 to 6 hours. Incidentally, since rapid raise of the temperature may damage the filter module due to the difference of thermal expansion coefficients between different fluororesins, the raising time of the temperature is set to be not less than 1 hour, and the longer the raising time is, the more desirable it is.

Moreover, to obtain the filter module 7 which is hard to be modified by heat at the time of use, since the longer the above-mentioned cooling time is, the more the residual stress is, it is desirable to cool gradually as much as possible.

Furthermore, range of between 100 and 250 degrees Centigrade is suitable for the retention temperature, and it is preferable to set the temperature from 0 to 10 degrees higher than the temperature at the time of manufacture of the filter module 7 or the film. Moreover, it is effective in heating in the surroundings where the filter is used by adding thermal treatment in a solution additionally after the thermal treatment in a gas, from a viewpoint of improving the heat-resistant of the filter module 17.

The above-mentioned filter module 7 is a product made from a fluororesin having heat-resistance and chemical resistance, and it is formed in the shape of hollow or a flat film or a tube, or in a packed column composed of a cylindrical vessel filled with pieces of granular fusuoresin as packed material, and it is preferable that the fixing substance to a film module is also made from a fluororesin.

Moreover, as for the gas which fills in the heat treatment vessel 15, what is not degraded the quality of the module 1 in the thermal treatment, such as inert gas, for example, nitrogen or argon, or steam, instead of the above-mentioned air A, is desirable.

And a liquid is also possible for what is filled in the heat treatment vessel 15 instead of gases, such as an atmosphere (air A), a kind of liquid which does not include an impurity as a contamination of the modules, such as pure water and ultrapure water, is suitable, and it is more desirable that the liquid has the property about pH value or dissolved oxygen concentration or chemical ingredient which is the same of that in the use environment of the filter. Thus, according to the Examples 1 through 6 in this embodiment, since the residual stress at the time of manufacture can be removed by adding thermal treatment before the use of the module, it becomes possible to obtain a stabilized treatment performance against repetitive heat Moreover, if the form of the filter module 7 made from a fluororesin is selected from the group of a hollow module, a module in the shape of pleats, a flat film, and a tube module, the fluororesin filter having stable permeability and less influence of pollution of water quality can be obtained.

Fourth Embodiment

Figure 7:
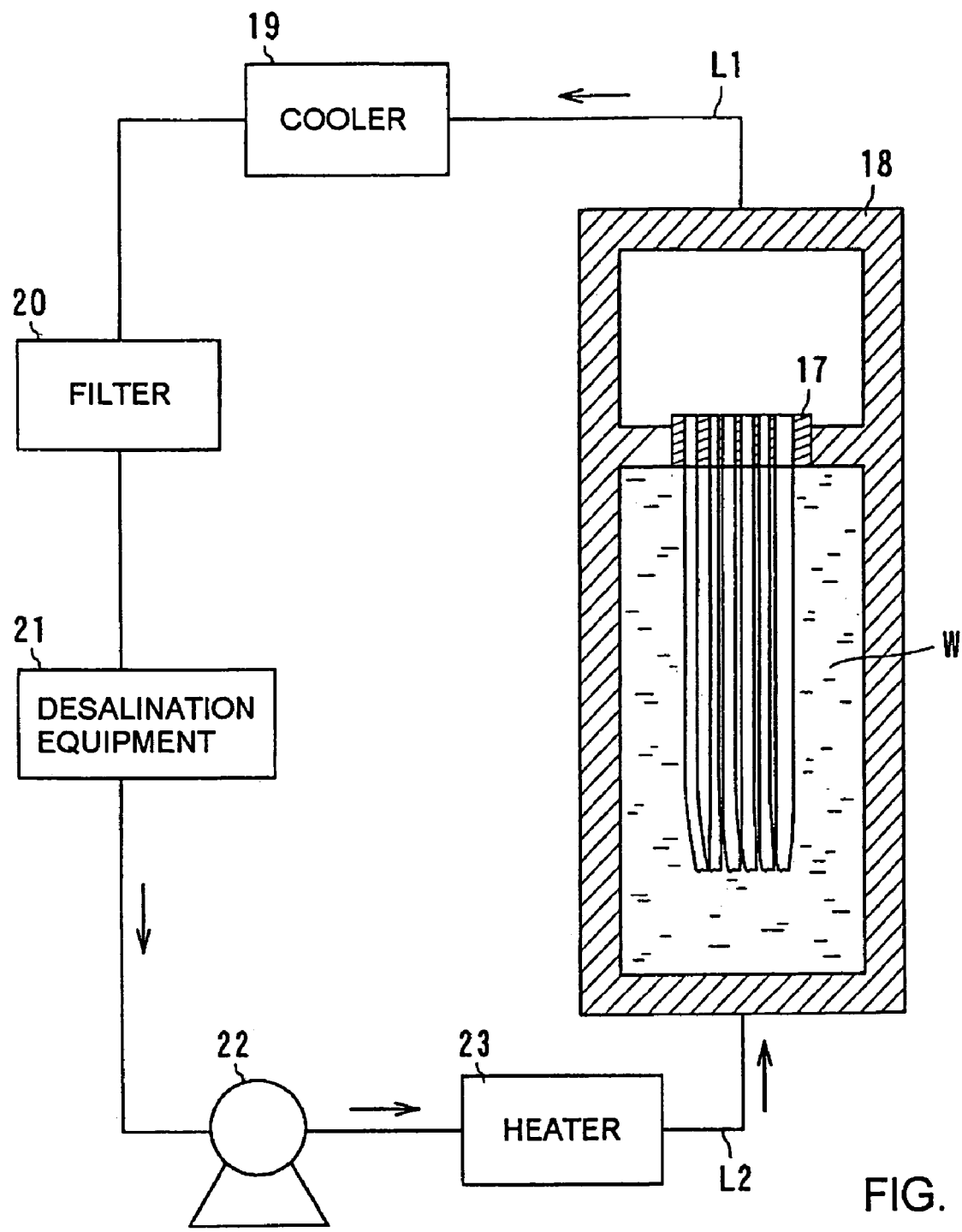
FIG. 7 is a basic cross sectional view of a preparing equipment of a filter module of a filtering apparatus of a fourth embodiment of this invention.

FIG. 7 is a basic cross sectional view of a preparing equipment of a filter module of a filtering apparatus of a fourth embodiment of this invention. It explains using the same code to a corresponding portion identically to the above-mentioned third embodiment.

As shown in FIG. 7, hot water W fills and a filter module 17 is installed in the pressure vessel 18 for hot water washing. And a cooler 19, a filter 20 and a desalination equipment 21 filled up with ion exchangers are installed on a line L1 whose one end is connected to the exit side of the hot water washing pressure vessel 18, and the another end of the line L1 is connected to a water supply side of a pump 22. One end of a line L2 is connected to the discharge side of the pump 22, and a heater 23 is installed on this line L2, and the another end of the line L2 is connected to the hot water washing pressure vessel 18.

Therefore, by driving the pump 12, hot washing water in the hot water washing pressure vessel 18 is cooled by the cooler 19, and afterward suspended solid is removed from the elution of the filter module 17 contained in the washing water at the filter 20, and the hot water from which ion ingredients are removed by the desalination equipment 21 is provided to the pump 22. And the washing water discharged from the pump 22 is heated as the hot water W, and the hot water W is supplied to the entrance side of the hot water washing pressure vessel 18.

As a result of examining the elution component in the immersion solution after immersing the filter module 7 of the hollow fibers made of a fluororesin into the hot water, whose pressure is not less than the pressure at which it does not boils, at a temperature of 230 degrees Centigrade for 1 hour, any components other than fluorine are not detected, and the permeability is also improved. This is shown as a case of an Example 9 in Table 2 shown below.

Moreover, experiments immersing in hot water at a temperature of 150 degrees Centigrade and 200 degrees Centigrade for 1 hour are shown as an Example 7 and an Example 8, respectively, and experiments applying steam at temperatures of 150, 200, and 230 degrees Centigrade are shown as Examples 10, 11, and 12, respectively. As shown in Table 2, these examples improve permeability of the filter and particularly reduce the elution amount of fluorine.

Figure 8:
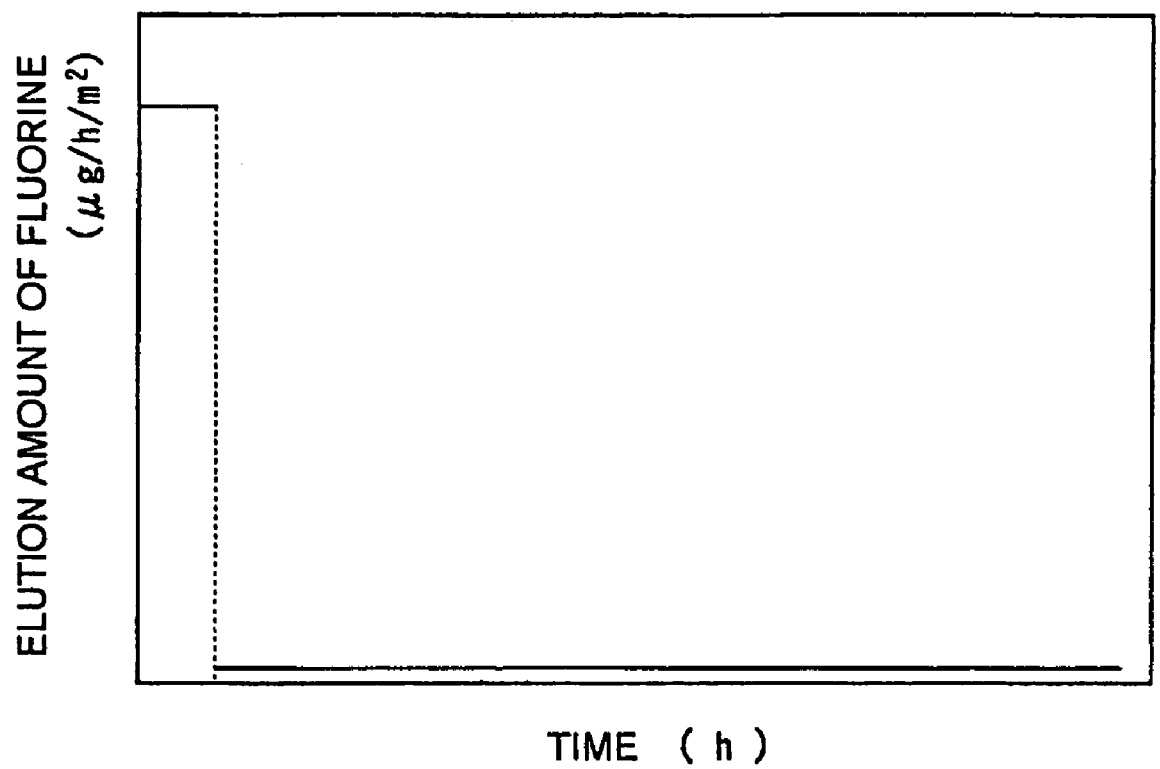
FIG. 8 is a graph showing change of fluorine elution velocity at the time of the film immersion in hot water by using an autoclave.

FIG. 8 is a graph showing change of fluorine elution velocity at the time of the film immersion in hot water by using an autoclave. As shown in FIG. 8, after most of the fluorine elutes for several hours, the elution is hardly confirmed. It turns out that it is possible to remove the fluorine elution by thermal treatment with hot water for several hours.

On the other hand, as shown in Comparison Examples 4 through 10 in Table 2, if the permeation of hot water W with high purity or a steam at a temperature of less than 100 degrees Centigrade, the elution amount of fluorine from the fluororesin increases and the permeability is markedly lowered as shown in Comparison Examples 7 and 9. And if the temperature of the hot water or the steam is over 250 degrees Centigrade and the permeation time is less than 1 hour, though the permeability is adequate, the quantity of the fluorine which elutes from the fluororesin increases as shown in Comparison Examples 6, 8 and 10. Moreover, if the temperature of the hot water W or the steam is set between 100 and 250 degrees Centigrade and the retention time is less than 1 hour, the quantity of the fluorine which elutes from the fluororesin increases and the permeability is markedly lowered as shown in Comparison Examples 4 and 5.

In Table 3, Examples 13 and 14 show cases of keeping the temperature of the heat treatment between 100 and 250 degrees Centigrade in inert gas for not less than 1 hour and afterward penetrating hot water W at a temperature of between 100 and 250 degrees Centigrade for not less than 1 hour to the filter with the pressure of not less than the pressure at which it boils, and Examples 15 and 16 show cases of keeping the temperature of the heat treatment between 100 and 250 degrees Centigrade in pure water for not less than 1 hour and afterward penetrating steam at a temperature of between 100 and 250 degrees Centigrade for not less than 1 hour to the filter, respectively.

TABLE 2

| | FILTER NUMBER | HOT WATER PEAMEATION | | STEAM PEAMEATION | | PERMEABILITY* | ELUTION AMOUNT* |
|---|---|---|---|---|---|---|---|
| | | HOT WATER TEMPERATURE (CENTIGRADE) | PEAMEATION TIME (HOUR) | STEAM TEMPERATIRE (CENTIGRADE) | PEAMEATION TIME (HOUR) | | |
| EXAMPLES | 7 | 150 | 1 | — | — | 100 | 115 |
| | 8 | 200 | 1 | — | — | 150 | 105 |
| | 9 | 230 | 1 | — | — | 160 | 100 |
| | 10 | — | — | 150 | 1 | 120 | 95 |
| | 11 | — | — | 200 | 1 | 160 | 90 |
| | 12 | — | — | 230 | 1 | 170 | 80 |
| COMPARISON EXAMPLES | 4 | 130 | 0.8 | — | — | 55 | 155 |
| | 5 | — | — | 130 | 0.8 | 60 | 150 |
| | 6 | — | — | 260 | 1 | 60 | 85 |
| | 7 | 90 | 0.8 | — | — | 30 | 130 |
| | 8 | 260 | 0.6 | — | — | 50 | 75 |
| | 9 | — | — | 90 | 0.8 | 35 | 135 |
| | 10 | — | — | 260 | 0.6 | 55 | 70 |

*100 AS A REFERENCE POINT

TABLE 3

| | HEAT TREATMENT CONDITION | | | HOT WATER PENETRATION HOT WATER | STEAM PENETRATION STEAM | | |
|---|---|---|---|---|---|---|---|
| FILTER NUMBER | TEMPERATURE (CENTIGRADE) | TIME (HOUR) | ATMOSPHERE | TEMPERATURE (CENTIGRADE) | TEMPERATIRE (CENTIGRADE) | PERMEABILITY* | ELUTION AMOUNT* |
| EXAMPLES 13 | 100 | 2 | INERT GAS | 150 | — | 120 | 110 |
| 14 | 250 | 1 | INERT GAS | 200 | — | 180 | 80 |
| 15 | 150 | 1 | PURE WATER | — | 150 | 140 | 115 |
| 16 | 200 | 1.5 | PURE WATER | — | 200 | 170 | 90 |

*100 AS A REFERENCE POINT

Clearly recognized from Table 3, by thermal treatment the filter on above-mentioned conditions, the residual stress at the time of manufacture can be removed efficiently, and by penetrating the hot water W or the steam on above-mentioned conditions, pollutant component of the water quality generated by fluorine elution at the time of use can be removed in a short time.

Thus, in this embodiment, since the hot water W, which penetrates through the filter module 17 and from which the elution component is removed with the filter 20 and which is desalinated by the desalination equipment 21, can be used in a circulation by using the equipment shown in FIG. 7, so the elution component is removable to decrease its concentration to thoroughly low level efficiently in a short time, compared with batch processing.

Moreover, although it is difficult in batch processing to remove the elution component inside of the films, by the above-mentioned circulatory method in this embodiment the elution component inside of the films can be removed effectively in a short time. And if the filter made from a fluororesin is replaced to the above-mentioned packed column filled up with pieces of granular fluororesins, the elution component is also efficiently removable.

In addition, in this embodiment, the filter module 17 is washed from the outside towards the inside of the module 17, but it is possible to wash the filter module 17 from the inside towards the outside of the module 17 by reversing the exit and the entrance of the hot water washing pressure vessel 18.

Moreover, the temperature of the hot water W used in this embodiment is between 100 and 250 degrees Centigrade as mentioned above, and between 1 hour and 1 week is suitable as for the processing time.

Furthermore, it is preferable that the hot water W of this embodiment is either pure water, steam, or a solution obtained by imitation of usage surroundings of a power plant concerning at least one of pH value, dissolved oxygen concentration, and at least a part of chemical ingredients.

Moreover, by gradually increasing the permeation temperature at some steps or in a fixed velocity with removing the elution component, the damage of the filter module 17 due to the thermal shock can be evaded, and by thermal treatment with removing the elution component, pollution of a system due to the elution component can be suppressed, therefore the processing time can be shortened.

Moreover, since the filter module 17 is hydrophobic, it is more desirable to immerse the filter module 17 in alcohol, such as isopropylalcohol, to make the module hydrophilic. And by replacing the heater 23 and the cooler 19 of this embodiment with a heat exchanger, a system can be simplified and thermal efficiency can also be improved.

Thus, in this embodiment, the filter module 17 can be washed by hot water W and the elution component can be removed beforehand, lowering of water quality can be prevented when the filter is the installed to be used in a power plant.

And if the quality of the hot water W is modified by the water quality of a power plant concerning at least one of pH value, dissolved oxygen concentration, and at least a part of chemical ingredients, by penetrating the hot water W whose water quality is equal or similar to that in a usage surroundings of the filter module 17, the elution components which elute in a solution at the time of use of the filter module 17 under high temperature can be effectively removed beforehand by washing or material regeneration, and the pollution due to usage of the filter module 17 can be suppressed lower compared with a case of merely using hot water.

Fifth Embodiment

Figure 9:
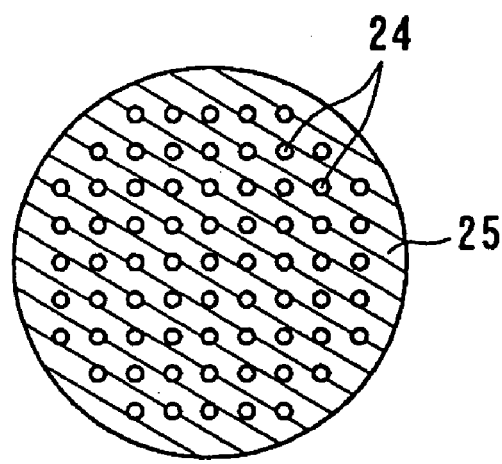
FIG. 9 is a sectional view showing a module seal portion of a filtering apparatus of a fifth embodiment in this invention.

FIG. 9 is a sectional view showing a module seal portion of a filtering apparatus of a fifth embodiment of this invention. As shown in FIG. 9, in this embodiment, a peripheral edge of hollow porosity films 24 made from polytetrafluoroethylene (PTFE), which is a kind of a fluororesin, is directly sealed by melted joining by support portion 25 made from tetrafluoroethylene-perfluoroalkylvinylether copolymer (PFA) which is a thermoplastic fluororesin whose melting point is less than that of PTFE.

Figure 21:
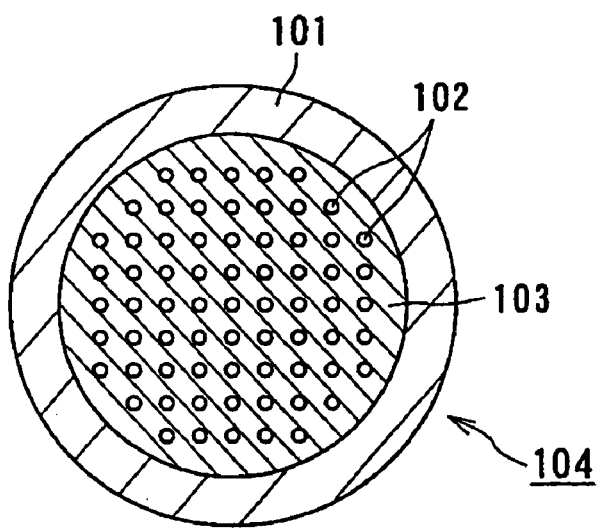
FIG. 21 is a sectional view showing an example of a seal portion of a filter module of the hollow porosity film obtained by a conventional method.

Next, a function of this embodiment is explained. For a filter for filtering hot water in a power plant, a heat cycle cannot be avoided, thus in the conventional filter shown in FIG. 21, the outer case 101 and the support portion 103, which differ in thermal expansion coefficients of their materials, are expanded and contracted by the heat cycle, and therefore the conventional filter module 104 is easy to be damaged.

Then, in this embodiment, by deleting the outer case 101 which may damage the filter module by exfoliation of the seal portion due to the large difference of expansion and contraction of different materials during the heat cycle, a region where different materials touch each other exists only between the hollow porosity film 24 and the support portion 25, therefore the expansion and the contraction is minimized and it becomes possible to make the damage of the filter module hard to occur.

In addition, for example, by using a sealing method shown in Japanese Patent Publication (Touroku) No. 2993217, the hollow porosity film 24 can be sealed by only using thermoplastic PFA by melting, it can achieve both the sealing and forming the support portion 25 simultaneously without using other encapsulants.

Moreover, as mentioned above, it is desirable to use PTFE as the hollow porosity film 23 made from a fluororesin used in this embodiment. And as for the thermoplastic fluororesin used as an encapsulant which forms support portion 25, for example, PFA, FEP, ETFE, polychlorotrifluoroethylene (PCTFE), and polyvinylidenefluoride (PVdF), etc. are considered. Among theme PFA and FEP, which are heat-resistant and have excellent chemical proof against both an acid and an alkali, are the same kind of resin as a PTFE hollow fiber with high affinity, and the most suitable as the encapsulant.

Furthermore, if the heat treatment and the hot water permeation are carried out as mentioned in the above-mentioned third and/or fourth embodiments to the filter module which is manufactured according to this embodiment, it can obtain stable permeability and provide a filter suitable to apply to the hot water in a power plant with less water pollution.

Thus, according to this embodiment, the length of contacting foreign materials between the periphery of the hollow porosity film 24 and the encapsulant is very slight, and dimensional change due to expansion and contraction by the heat cycle also becomes minute, and it can form strong module seal portion against the heat cycle.

Sixth Embodiment

Figure 10:
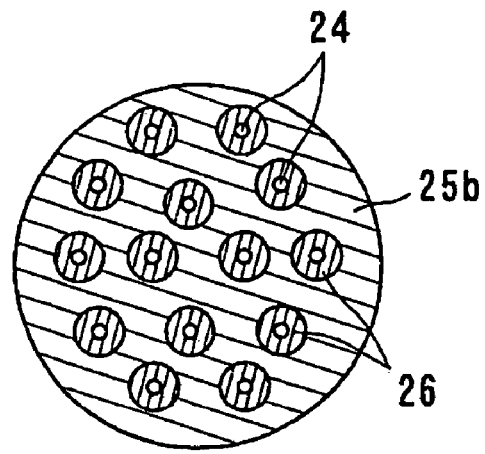
FIG. 10 is a sectional view showing module seal portion of a filtering apparatus of a sixth embodiment of this invention.

FIG. 10 is a sectional view showing module seal portion of a filtering apparatus of a sixth embodiment of this invention. As shown in FIG. 10, the support portion 25 made from PFA in the fifth embodiment shown in FIG. 9 is replaced with a support portion made from PTFE in this embodiment, and a seal portion 26 composed of PFA, which has a melting point lower than that of PTFE, seals between this support portion 25 and the hollow porosity film 24.

For example, PFA tubes are covered on a seal portion of the hollow porosity film 24 made from PTFE, and the hollow porosity film 24 is seated at the seal portion 25b made from PTFE by inserting the PFA tubes into pores formed in support, portions 25b and melting PFA like the above-mentioned fifth embodiment.

In addition, PTFE is desirable to use as the hollow porosity film made from a fluororesin in this embodiment. And as a substance of the support portion 25b, metals, such as stainless steel, PTFE, PFA and FEP are suitable. And suitable thermoplastic fluororesins used as an encapsulant are PFA and FEP, which are in the same kind of resin as the hollow porosity film 24 made from PTFE and have high affinity.

Moreover, if the filter module manufactured in this embodiment is heated and permeated with hot water according to a method mentioned in the third embodiment and/or the fourth embodiment, it can obtain more stable permeability and provide a filter which is suitable for hot water of a power plant with less water pollution.

Thus, in this embodiment, since the length where foreign materials contact, such as a joint of the periphery of the hollow porosity film 24 and the seal portion 26 and a joint of the support portion 25b and the seal portion 26, is very slight, the difference of the length of expansion and contraction due to the heat cycle also becomes minute, and it can form the support portion equipped with strong module seal portion against the heat cycle.

Seventh Embodiment

Figure 11:
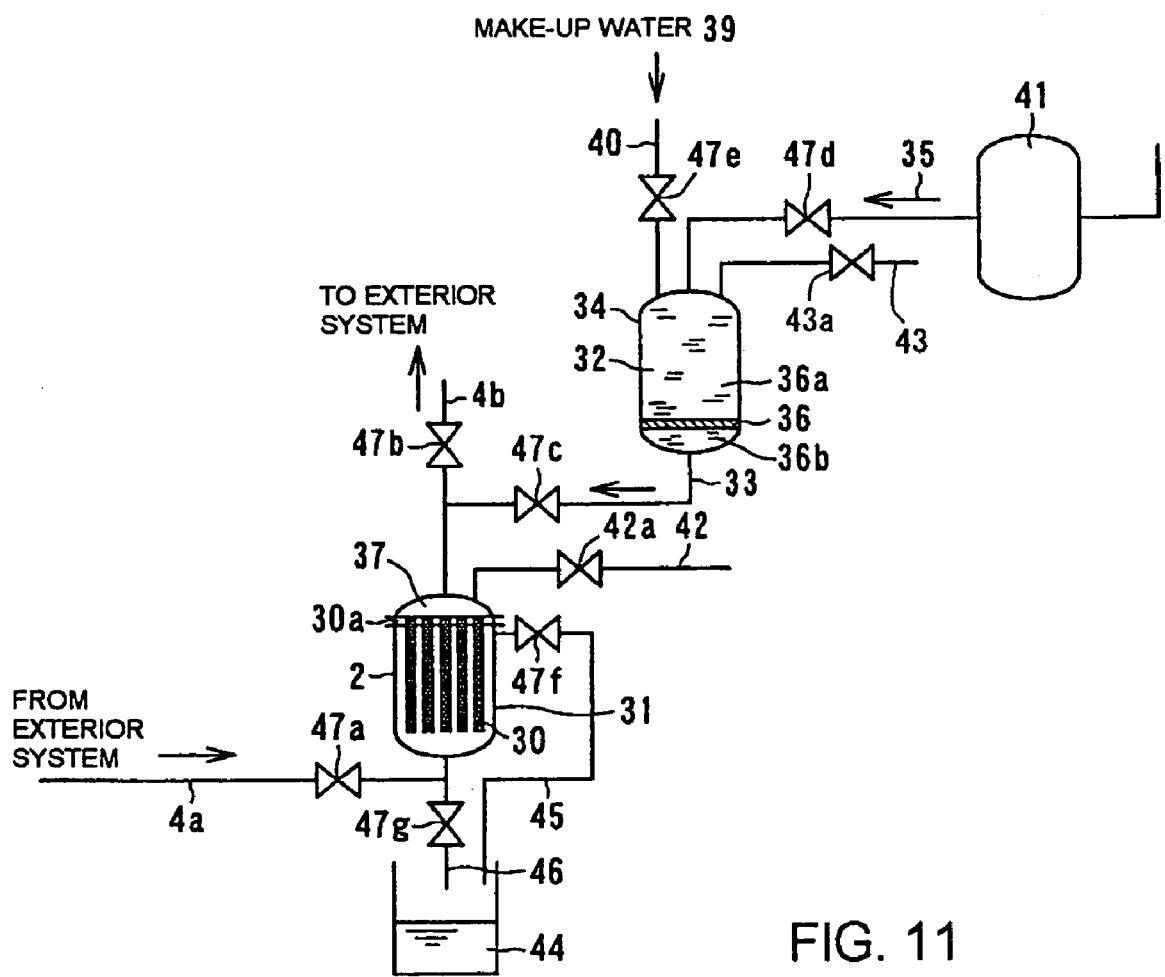
FIG. 11 is a schematic block diagram showing a filtering device of a seventh embodiment of this invention.

FIG. 11 is a schematic block diagram showing a filtering device of a seventh embodiment of this invention. A filtering device of this embodiment has a filtering apparatus 31 composed of a vessel 2 and a filter 30 suspended with a canister plate 30a in the vessel 2. A feed inlet line 4a for introducing feed and a filtrate outlet line 4b for discharging filtrate are connected to the filtering apparatus 31, respectively. The upper part of inside of the filtering apparatus 31 over the canister plate 30a is filtrate accumulation space 37, and a back wash line for supplying back wash water 32 is connected to the filtrate accumulation space 37 side, and a back wash tank 34 to store the back wash water 32 is installed on the back wash line 33.

The back wash tank 34 is divided into two compartments by a partition 36, which easily passes liquid component such as the back wash water 32 and hardly passes gas component such as the gas 35. A gas supply line for supplying the gas 35 and a make-up water supply line 40 for supplying make-up water 39 are connected to a divided compartment (a first compartment) 36a, on the other hand, the another divided compartment (a second compartment) 36b is connected to the filtrate accumulation space 37 by the back wash line 33. A gas tank 41 is settled on the gas supply line 38 to control pressure of the supplied gas 35.

Leak lines 42 and 43 which have the leak valves 42a and 43a, respectively, are connected to the filtrate accumulation space 37 and the first compartment 36a side of the back wash, tank 34, respectively. Moreover, a waste receiving tank 44 is arranged under the filtering apparatus 31, a drain lines 45 is led to the waste receiving tank 44 from the upper part of the feed side of the filtering apparatus 31 below the canister plate 30, and a drain line 46 is led to the waste receiving tank 44 from the bottom of the filtering apparatus 31. Each line 4a, 4b, 33, 38, 40, 45, 46 has a valves 47a through 47b for opening or closing, respectively.

Next, a function of this embodiment is explained. In usual filtering process of feed, only the valve 47a of the feed inlet line 4a and the valve 47b of the filtrate outlet line 4b are open and the other valves are all closed, and the feed is supplied to the filtering apparatus 31 through the feed inlet line 4a and filtered with the filter 30, and afterward the filtrate is discharged to outer system through the filtrate outlet line 4b.

On the other hand, in back wash operation, the valve 47a of the feed inlet line 4a and the valve 47b of the filtrate outlet line 4b is closed, and at first on a process preceding the back wash operation, it opens the leak valve 42a of the leak line 42, which is connected to the filtrate accumulation space 37, and the valve 47c of the back wash line 33 to supply the water 32 in the back wash tank 34 to the filtering apparatus 31. Thus, if gas residually stays in the filtrate accumulation space 37, the water 32 replaces the gas, and therefore it effectively prevents to make the filter Next, as back wash operation, while the temperature inside of the filter 31 is kept less than 100 degrees Centigrade the valve 47c of the back wash line 33, which connects the back wash tank 34 and the gas tank 41, is opened, it opens the valve 47d of the gas supply line 38 to supply gas of certain pressure from the gas tank 41 to the first compartment 36a of the back wash tank 34. Thus water in the back wash tank 34 is poured into the filtering apparatus 31 and the water passes through the filter 30 in the direction contrary at the time of the filtering process. In this case, it opens the valve 47f of the drain line 45 connected to the upper part of the feed side of the filtering apparatus 31 and the waste receiving tank 44 receives drain by overflowing.

That is, as mentioned above, the inside of the back wash tank 34 is divided into two compartments by the partition 36 which can pass the water 32 easily but is hard to pass the gas 55 and the second compartment 36b is filled with the water 32 and communicated to the filtering apparatus 31. And the gas supply line 38, the make-up water supply line 40 for supplying the make-up water 39 with the valve 47e is connected to the first compartment 36a. Thus the necessity amount of the make-up water for the back wash operation is supplied and the gas 35 is supplied for pressurizing the water 32.

Since gas 35 is hard to pass the partition 36, when the water 32 in the first compartment 36a of the back wash tank 34 is exhausted, supply of the water 32 to the filtering apparatus 31 stops. At this time it closes the valve 47d of the gas supply line 38. Next, it opens the drain valve 47f to collect suspended solid removed from the filter 30 together with water in the filter 31. If the filter 30 is constructed as a hollow fiber filter which carries out film vibration by rise of air bubbles poured into the water, it is effective in removing the suspended solid on the filter 30 to pour gas from the lower part of the filtering apparatus 31 for performing scrubbing operation, after the back wash operation from the back wash tank 34.

Moreover, since the leak line 43 with the leak valve 43a is connected to the first compartment 36a of the back wash tank 34, by opening the leak valve 43a it can release the air and supply the make-up water 39 in a short time. Therefore, it is possible to operate back wash repeatedly and to remove the suspended solid from the filter effectively.

In addition, if the partition 36 arranged inside of the back wash tank 34 is hydrophilic, that is, for example, the partition 36 is composed of hydrophilic film or hydrophilic packed material, it is effective in prevention of making the filter 50 hydrophobic because the gas 35 and the water 32 are easily separated each other.

Furthermore, if the partition 36 has a flat film, or a film in the shape of pleats, or a cylindrical film, or a hollow film, to enlarge the film area of the partition 36, it can decrease pressure loss of the partition 36 and therefore the pressure of the supplied gas 35 can be lowered.

Moreover, if the pressure of the gas 35 for pushing out the water in the back wash tank 34 is not set constant and once it stores gas in the gas tank 41 and afterward it instantly supplies the water 32 of the-back wash tank 34 into the filtering apparatus 31, the back wash operation can be performed effectively. Furthermore, if the pressure of the gas 35 at the time of pushing out the water in the first compartment 36a of the back wash tank 34 is set below the minimum pressure at which the partition 36 starts to pass the gas 35, it is economical by minimizing the volume of the gas tank 41. For example, if the pressure in the gas tank 41 is set ten times as large as the above-mentioned minimum pressure, the volume of the gas tank 41 can be set one ninth of that of the back wash water. It is adequate that the pressure at the time of extruding the water 32 is about between 0.1 MPa and 1 MPa from a viewpoint of the passing pressure of the gas 35 through the partition 36, and the pressure of the gas tank 41 is between 1 MPa and 15 MPa.

In this embodiment, since the back wash of the filter 30 can be carried out only by gas pressurizing, without making the filter 30 hydrophobic, it can simplify equipment and reduce time concerning process to make hydrophilic and purification process of inside of the filtering apparatus to minimize restarting time of the filtering apparatus 31, and the chemicals waste is not produced and treatment process of the chemicals waste becomes unnecessary.

In addition, as mentioned in from the first embodiment to the fourth embodiment, a fluororesin filter, which is heated beforehand in at least one of air and solution, or permeated with hot water or steam, is also applicable to the filter 30 in this embodiment.

Eighth Embodiment

Figure 12:
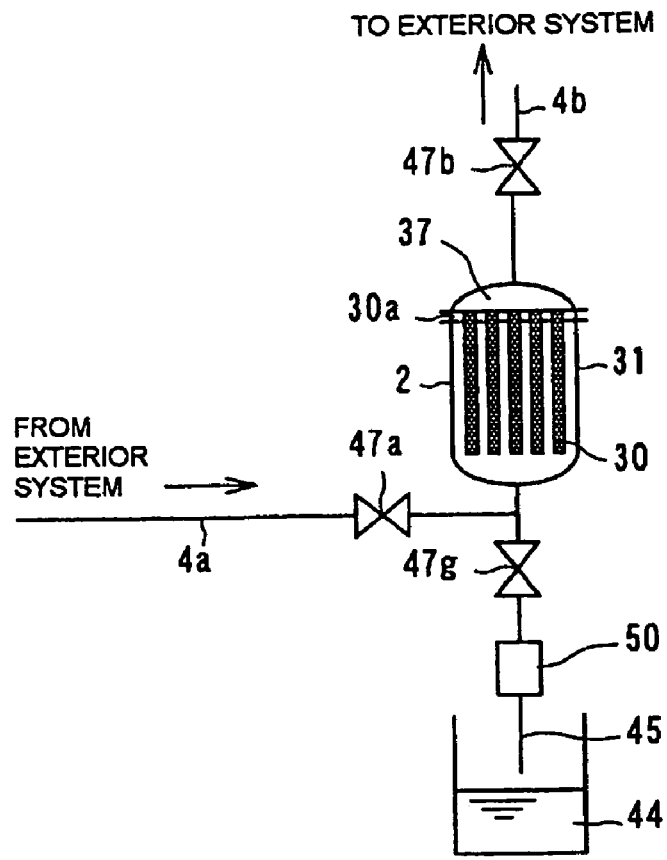
FIG. 12 is a schematic block diagram showing a filtering device of an eighth embodiment of this invention.

FIG. 12 is a schematic block diagram showing a filtering device of an eighth embodiment of this invention. A filtering device of this embodiment has a filtering apparatus 31 composed of a vessel 2 and a filter 30 suspended with a canister plate 30a in the vessel 2. A feed inlet line 4a for introducing feed and a filtrate outlet line 4b for discharging filtrate are connected to the filtering apparatus 31, respectively. The upper part of inside of the filtering apparatus 31 over the canister plate 30a is filtrate accumulation space 37.

And a cooler 50 for cooling drain and the valve 47g is arranged on the drain line 45 introduced from the bottom of the filtering apparatus 31. In addition, back wash line 33 using water is omissible in this embodiment.

In this embodiment, in back wash operation, while it closes the valves 47a and 47b of a system and controls flow rate by controlling the openings of the valve 47g with keeping high temperature and high pressure in the filtering apparatus 31, solution in the filtering apparatus 21 is cooled by the cooler 50 and then is discharged to the waste receiving tank 44. In accordance with lowering of the pressure in the filtering apparatus 21, water in the filtrate accumulation space 37 passes the filter 30 with expanding; thereby back wash action is performed. That is, this pressure lowering makes the fluid passing the filter 30 from liquid phase to steam and rapidly increases the volume of the fluid compared with the liquid phase.

Therefore, the volume of the medium passing the filter 30 also increases remarkably, and it can achieve higher effect than that of washing by using solution. Suspended solid is carried together with steam and held in solution extracted by the cooler 50, and afterward collected in the waste receiving tank 44.

According this embodiment, back wash operation can be performed by using only high-pressure hot water in the filtering apparatus 31 with keeping inside of the filtering apparatus 31 in hot condition, without cooling the filtering apparatus 31, therefore the re-starting time of the filtering apparatus 31 can be shortened drastically. And waste is less generated because the back wash water is not supplied from outer system.

That is, according to this embodiment, back wash operation of the filtering apparatus can be performed by using high-pressure hot water in the filtering apparatus 31 without carrying back wash water from outside. Since the hot high-pressure water in the filtering apparatus is returned to liquid phase by the cooler 50 and drained while the water is pulling out with decompressing and expanding, any large washing tank is unnecessary.

Moreover, although the water in the filtrate accumulation space 37 of the upper part of the filtering apparatus 31 is a liquid since the pressure is high at first, as the pressure declines, the water boils and becomes steam and its volume expands rapidly.

Therefore, since large quantity of the steam passes through the filter at a large flex density, back wash process can be achieved with the compressed hot water in the filtrate accumulation space of the filtering apparatus. What passes through the filter is only steam, thus it can avoid making the filter hydrophobic.

In addition, as mentioned in from the first embodiment to the fourth embodiment, a fluororesin filter, which is heated beforehand in at least one of air and solution, or permeated with hot water or steam, is also applicable to the filter 30 in this embodiment. And it is also possible that additional back wash equipment explained in the seventh embodiment is arranged in this embodiment.

Ninth Embodiment

Figure 13:
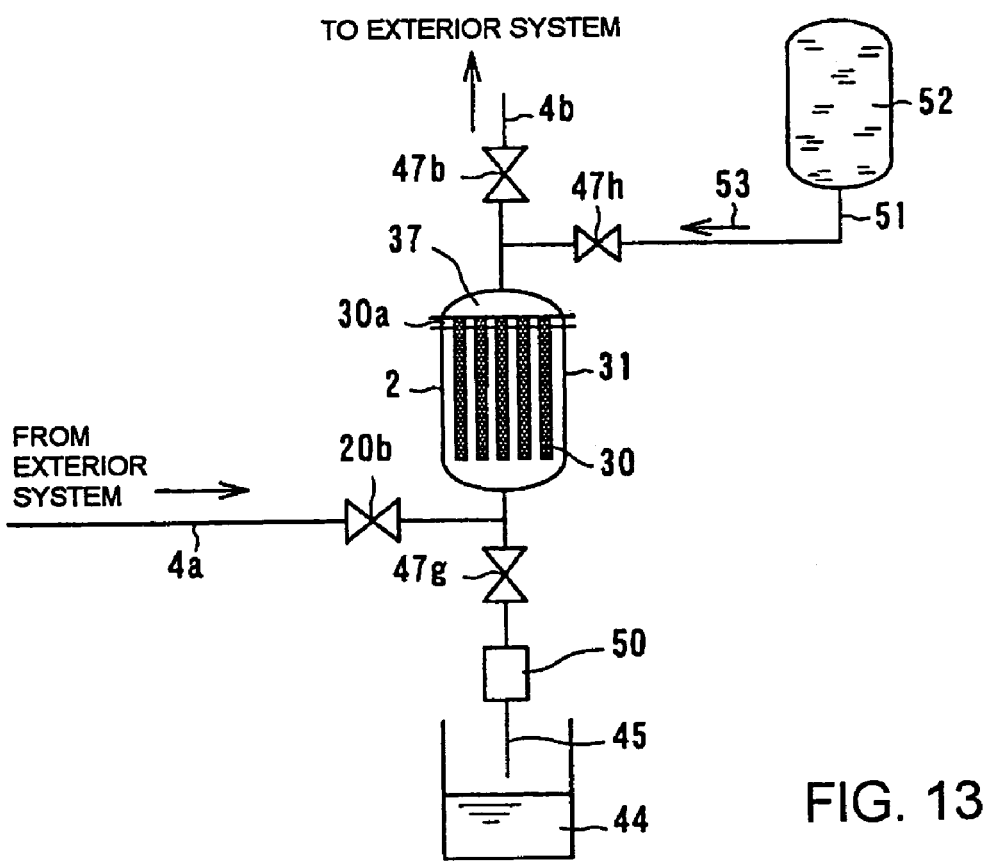
FIG. 13 is a schematic block diagram showing a filtering device of a ninth embodiment of this invention.

FIG. 13 is a schematic block diagram showing a filtering device of a ninth embodiment of this invention. A filtering device of this embodiment has a filtering apparatus 31 composed of a vessel 2 and a filter 30 suspended with a canister plate 30a in the vessel 2. A feed inlet line 4a for introducing feed and a filtrate outlet line 4b for discharging filtrate are connected to the filtering apparatus 31, respectively. The upper part of inside of the filtering apparatus 31 over the canister plate 30a is filtrate accumulation space 37, and a steam generator 52 is connected to the filtrate accumulation space 37 side of the filtering apparatus 31 by a steam line 51 having a valve 47h. And a cooler 50 for cooling drain and a valve 47g is arranged on the drain line 45 introduced from the bottom of the filtering apparatus 31.

According to the above-mentioned composition, in back wash operation, after draining the solution in the filtering apparatus 31 by the method as mentioned in the eighth embodiment, it opens the valve 47h to supply steam 53 from the steam generator 52 to the filtering apparatus 31 through the steam line 51, and suspended solid on the filter 30.is washed and removed by the steam 53, and afterward the steam is extracted by the cooler 50 and held in solution and collected in the waste receiving tank 44. Thus, since steam 53 can be obtained continuously, the amount of the washing steam can be adjusted freely according to an adhesion state of the suspended solid.

Moreover, it is also possible to operate back wash with steam in the steam generator 52 after draining water in the filtering apparatus 31 through the valve 47g as the temperature inside of the filtering apparatus 31 is set less than 100 degrees Centigrade. In this case, it can avoid making the filter 30 hydrophobic since the back wash operation can be achieved by the steam 53 at low pressure, and the cooler 50 can be omitted or the volume of equipment can be minimized since the steam is extracted in the filtering apparatus 51.

According to this embodiment, it can avoid making the filter 30 hydrophobic because steam is used to the back wash operation, and the back wash is performed with few amounts of wastes since the steam 53 is extracted to be changed into water with remarkably decreasing the volume.

In addition, as mentioned in from the first embodiment to the fourth embodiment, a fluororesin filter, which is heated beforehand in at least one of air and solution, or permeated with hot water or steam, is also applicable to the filter 30 in this embodiment.

Tenth Embodiment

Figure 14:
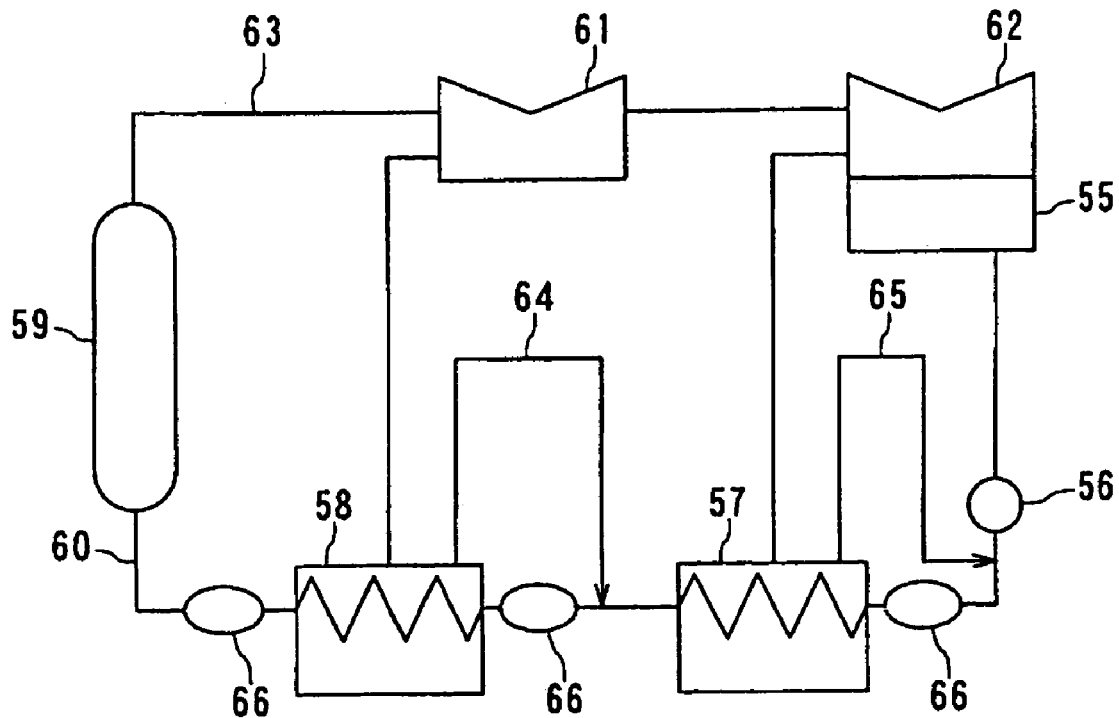
FIG. 14 is a basic block diagram showing a power plant of a tenth embodiment of this invention.

FIG. 14 is a basic block diagram showing a power plant of a tenth embodiment of this invention. As shown in FIG. 14, the power plant of this embodiment is composed of a feedwater line 60 which flows feedwater from a condenser 55 to a steam generator 59 through a condensate demineralizer system 56, a low pressure heater 57, and a high pressure heater 58. In this feedwater line 60, wet steam which drove a turbine is cooled by the condenser 55 and changed into condensate, and ionic impurities contained in this condensate is removed by the condensate demineralizer system and the condensate becomes feedwater, and this feedwater is heated by the low pressure heater 57 and the high pressure heater and thus becomes hot feedwater to be supplied to the steam generator 59.

Moreover, the power plant of this embodiment is equipped with a main steam line 63 from a steam generator 59 to a high pressure turbine 61 and a low pressure turbine 62, and in this main steam line, steam generated in the steam generator 59 drives the high pressure turbine 61 and the low pressure turbine 62.

Furthermore, the power plant of this embodiment is composed of a high pressure heater drain line 64 for supplying steam from the high pressure turbine 61 extracted by the high pressure heater 58 to the feedwater line 60, and a low pressure heater drain line 65 for supplying steam from the low pressure turbine 62 extracted by the low pressure heater 57 to the feedwater line 60. In this heater drain lines 64, 65, steam from the high pressure turbine 61 and low pressure turbine 62, respectively, is heated as feedwater and afterward extracted by the high pressure heater 58 and low pressure heater 59, respectively, and the extracted water, that is, drain, is returned to the feedwater line 60.

And in the power plant of this embodiment, two or more filtering apparatuses 66 of any of the above-mentioned first through ninth embodiments is installed in the feedwater line 60 between the condenser 55 and the steam generator 59 through the condensate demineralizer system 56, the low pressure heater 57, and the high pressure heater 58.

That is, in the feedwater line 60, these feedwater filtering apparatuses 66 are installed on the inlet side of the low pressure heater 57 and the inlet side and the outlet side of the high pressure heater 58, respectively.

According to this embodiment, by installing the feedwater filtering apparatuses 66 on the inlet side of the low pressure heater 57 and the inlet side and the outlet side of the high pressure heater 58, respectively, in the feedwatrer line 60, suspended solid contained in the feedwater can be reduced, and it makes possible to reduce erosion inside of piping, prevention of heat transmission caused by adhering the suspended solid to the surface of the heater tube, and a washing frequency of the heater tube, because of the reduction effect of the suspended solid.

Eleventh Embodiment

Figure 15:
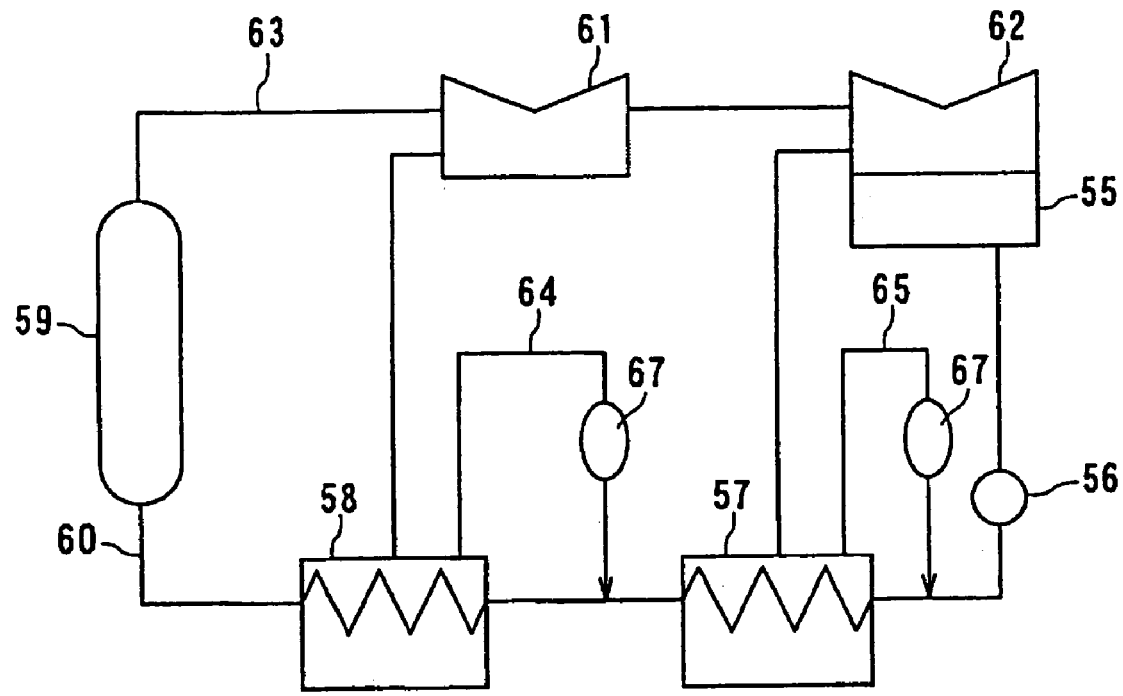
FIG. 15 is a basic block diagram showing a power plant of a eleventh embodiment of this invention.

FIG. 15 is a basic block diagram showing a power plant of a eleventh embodiment of this invention. In addition, in this embodiment, same or corresponding portion of the above-mentioned tenth embodiment of the power plant is explained with assigning the same reference numeral, and only different composition and function from the above-mentioned tenth embodiment are explained. The same is said of each embodiment of a power plant.

As shown in FIG. 15, in the power plant of this embodiment, heater drain filtering apparatuses 67 of any of the above-mentioned first through ninth embodiments are installed on a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

According to this embodiment, by installing the heater drain filtering apparatuses 67 on the heater drain lines 64, 65, respectively, suspended solid contained in the heater drain can be reduced, and it makes possible to reduce erosion inside of piping, prevention of heat transmission caused by adhering the suspended solid to the surface of the heater tube, and a washing frequency of the heater tube, because of the reduction effect of the suspended solid.

Twelfth Embodiment

Figure 16:
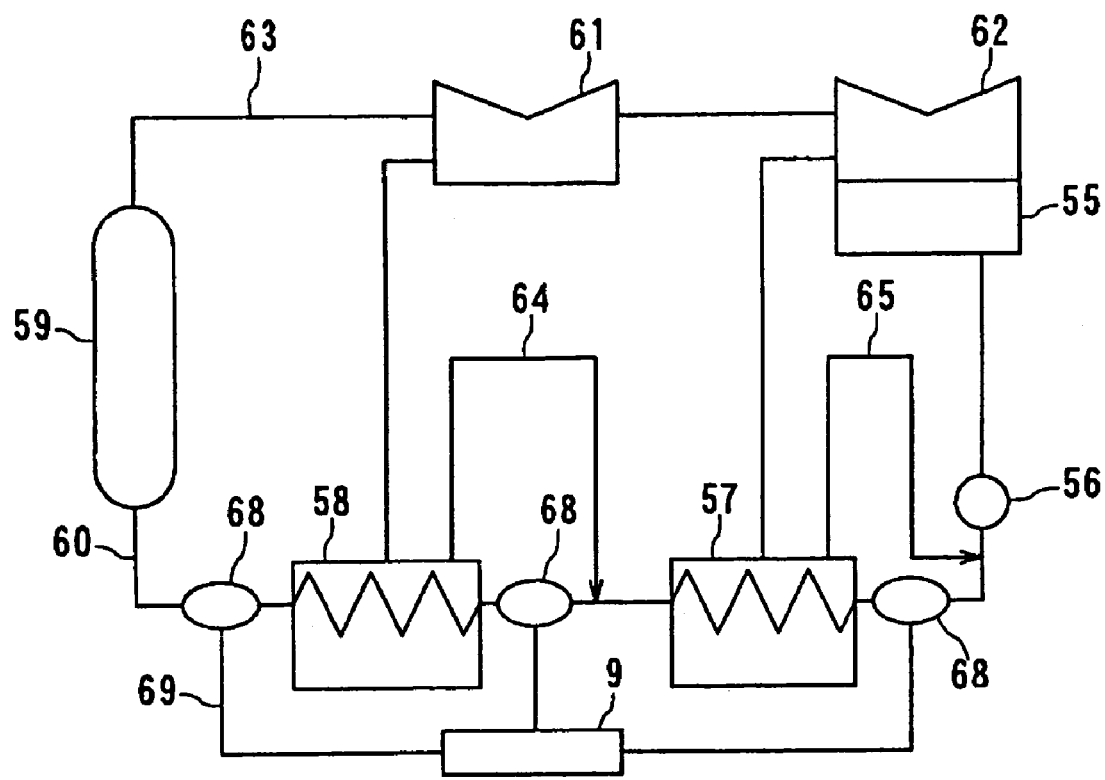
FIG. 16 is a basic block diagram showing a power plant of a twelfth embodiment of this invention.

FIG. 16 is a basic block diagram showing a power plant of a twelfth embodiment of this invention. As shown in FIG. 16, similar to the tenth embodiment shown in FIG. 14, two or more feedwater filtering apparatuses 68 of any of the above-mentioned first through ninth embodiments are installed on the feedwater line 60 between the condenser 55 and the steam generator 59 through the condensate deminelarizer equipment 56, the low pressure heater 57 and the high pressure heater 58.

That is, in the feedwater line 60, these feedwater filtering apparatuses 68 are installed on the inlet side of the low pressure heater 57 and the inlet side and the outlet side of the high pressure heater 58, respectively.

Additionally, in this embodiment, a back wash line 68 connects each feedwater filtering apparatus 68, and the back wash line 68 is connected to the back wash equipment 9.

According to this embodiment, in addition to acquiring the same effect as mentioned in the tenth embodiment, by installing the back wash equipment 9 corresponding each feedwater filtering apparatus 68, it is possible to always sustain original performance of each feedwater filtering apparatus 68.

Thirteenth Embodiment

Figure 17:
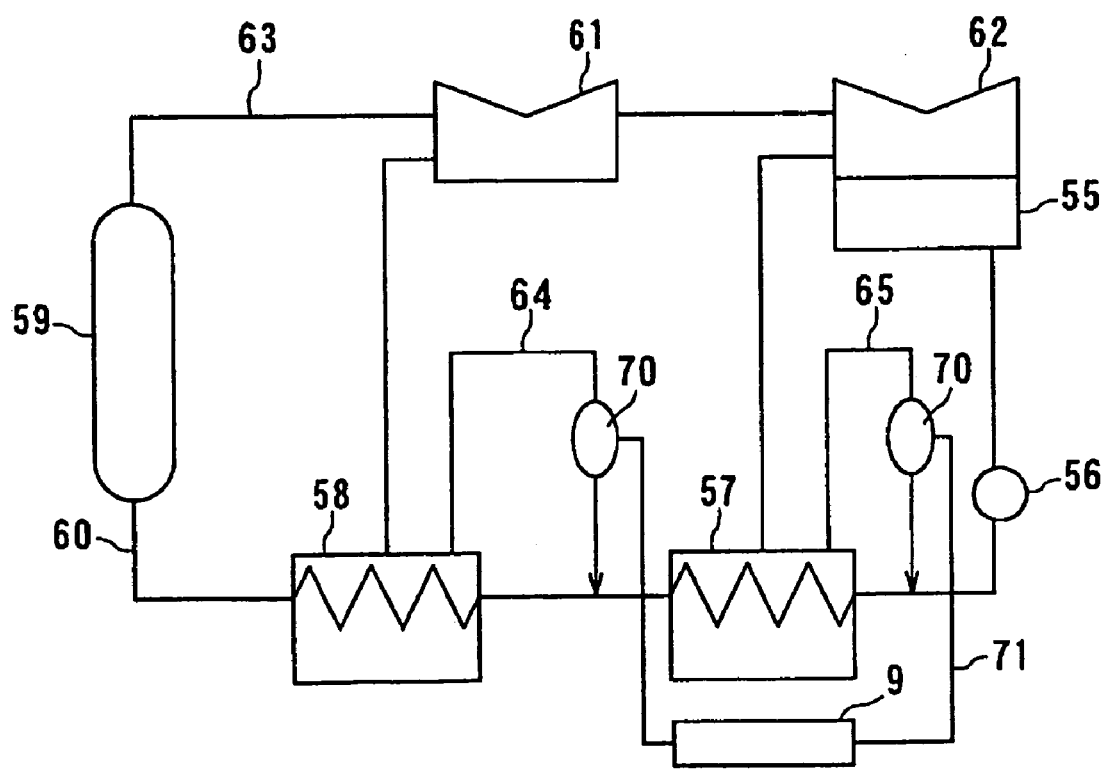
FIG. 17 is a basic block diagram showing a power plant of a thirteenth embodiment of this invention.

FIG. 17 is a basic block diagram showing a power plant of a thirteenth embodiment of this invention. As shown in FIG. 17, in the power plant of this embodiment, similar to the eleventh embodiment shown in FIG. 15, heater drain filtering apparatuses 70 of any of the above-mentioned first through ninth embodiments are installed on a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

Additionally, in this embodiment, a back wash line 71 connects each feedwater filtering apparatus 71, and the back wash line 71 is connected to the back wash equipment 9.

According to this embodiment, in addition to acquiring the same effect as mentioned in the tenth embodiment, by installing the back wash equipment 9 corresponding each heater drain filtering apparatus 70, it is possible to always sustain original performance of each heater drain filtering apparatus 70.

Additionally, in the twelfth and thirteenth embodiments, besides or instead of the back wash equipment 9, the above-mentioned chemical wash equipment or the scrubbing air supply equipment 12 can be installed in the power plant.

Fourteenth Embodiment

Figure 18:
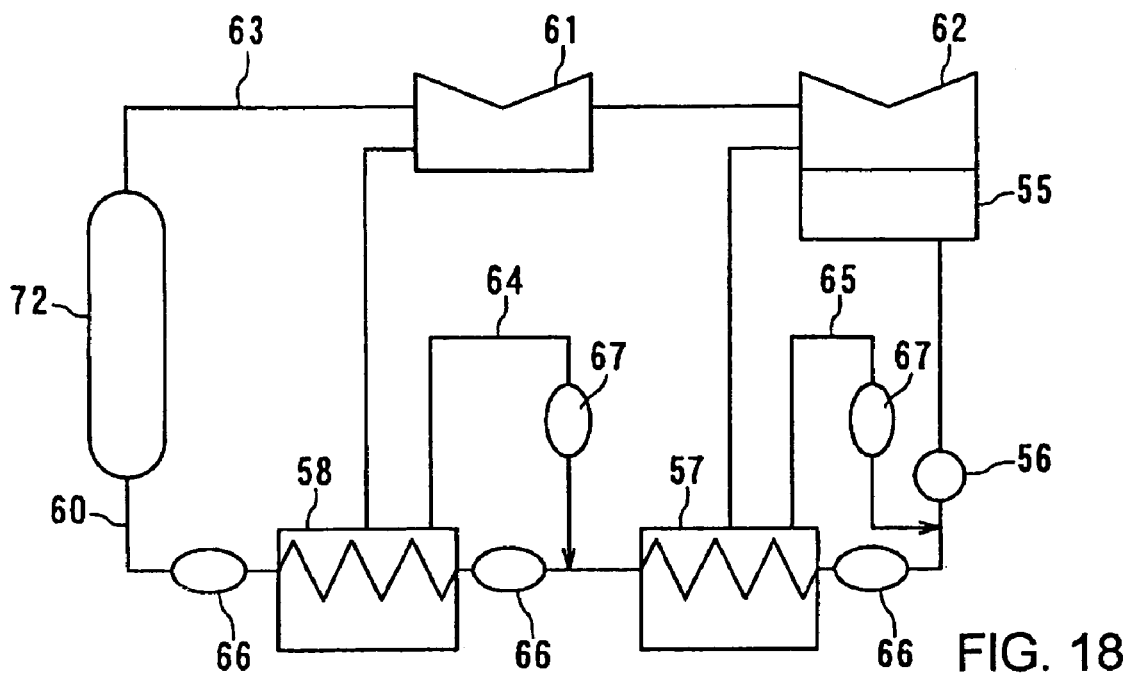
FIG. 18 is a basic block diagram showing a power plant, which is a example of installing a filtering apparatus of any of the above-mentioned first through ninth embodiment in a boiling water reactor (BWR) power plant.

FIG. 18 is a basic block diagram showing a power plant, which is a example of installing a filtering apparatus of any of the above-mentioned first through ninth embodiment in a boiling water reactor (BWR) power plant.

As shown in FIG. 18, the power plant of this embodiment is equipped with a feedwater line 60 on which feedwater flows from a condenser 55 to a nuclear reactor pressure vessel 72 through a condensate deminelarizer equipment 56, a low pressure heater 57 and a high pressure heater 58.

Moreover, the power plant of this embodiment is equipped a main steam line 63 from the nuclear reactor pressure vessel 72 to the high pressure turbine 61 and the low pressure turbine 62, and a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

In this BWR power plant of this embodiment, two or more feedwater filtering apparatuses 66 of any of the above-mentioned first through ninth embodiments are installed on the feedwater line 60 between the condenser 55 and the nuclear reactor pressure vessel 72 through the condensate deminelarizer equipment 56, the low pressure heater 57 and the high pressure heater 58.

That is, in the feedwater line 60, these feedwater filtering apparatuses 68 are installed on the inlet side of the low pressure heater 57 and the inlet side and the outlet side of the high pressure heater 58, respectively.

Moreover, in the BWR power plant of this embodiment, heater drain filtering apparatuses 67 of any of the above-mentioned first through ninth embodiments are installed on a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

According to this embodiment, by installing the feedwater filtering apparatuses 66 on the inlet side of the low pressure heater 57 and the inlet side and the outlet side of the high pressure heater 58, respectively, and installing the heater drain filtering apparatuses 67 on the heater drain lines 64, 65, respectively, suspended solid contained in the feedwater and the heater drain can be reduced, and it makes possible to reduce erosion inside of piping, prevention of heat transmission caused by adhering the suspended solid to the surface of the heater tube, and a washing frequency of the heater tube, because of the reduction effect of the suspended solid.

Fifteenth Embodiment

Figure 19:
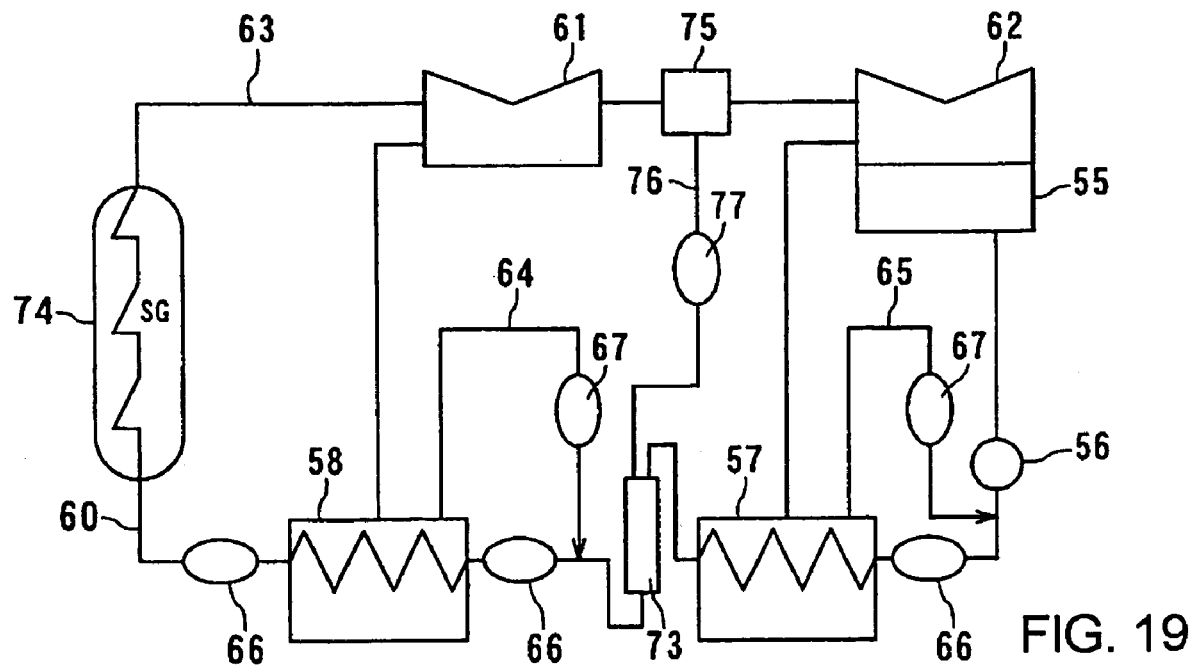
FIG. 19 is a basic block diagram showing a power plant, which is a example of installing a filtering apparatus of any of the above-mentioned first through ninth embodiment in a pressurized water reactor (PWR) power plant.

FIG. 19 is a basic block diagram showing a power plant, which is a example of installing a filtering apparatus of any of the above-mentioned first through ninth embodiment in a pressurized water reactor (PWR) power plant.

As shown in FIG. 19, the PWR power plant of this embodiment is equipped with a feedwater line 60 on which feedwater flows from a condenser 55 to a steam generator 74 through a condensate deminelarizer equipment 56, a low pressure heater 57, an air evacuator 73, and a high pressure heater 58. Here, the air evacuator 73 discharges a noncondensable gas to outer atmosphere with a little steam, and a moisture separator 75 installed between the high pressure turbine 61 and the low pressure turbine 62 and connected to the air evacuator 73 through a moisture separator drain line 76 removes drops which exist in the steam.

Moreover, the power plant of this embodiment is equipped a main steam line 63 from the steam generator 74 to the high pressure turbine 61 and the low pressure turbine 62, and a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

Furthermore, in this PWR power plant of this embodiment, two or more feedwater filtering apparatuses 66 of any of the above-mentioned first through ninth embodiments are installed on the feedwater line 60 between the condenser 55 and the steam generator 74 through the condensate deminelarizer equipment 56, the low pressure heater 57, the air evacuator 71, and the high pressure heater 58.

That is, in the feedwater line 60, these feedwater filtering apparatuses 68 are installed on the inlet side of the low pressure heater 57 and the inlet side and the outlet side of the high pressure heater 58, respectively.

Moreover, in the PWR power plant of this embodiment, heater drain filtering apparatuses 67.of any of the above-mentioned first through ninth embodiments are installed on a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively. And a moisture separator drain filtering apparatus 77 of any of the above-mentioned first through ninth embodiments is installed on the moisture separator drain line 75 on the moisture separator drain line 76 from the moisture separator 75 and the air evaporator 73.

According to this embodiment, by installing the feedwater filtering apparatuses 66 on the inlet side of the low pressure heater 57 and the inlet side and the outlet side of the high pressure heater 58, respectively, installing the heater drain filtering apparatuses 67 on the heater drain lines 64, 65, respectively, and installing the moisture separator drain filtering apparatus 77 on the moisture separator drain line 76, suspended solid contained in the heater drain can be reduced, and it makes possible to reduce erosion inside of piping, prevention of heat transmission caused by adhering the suspended solid to the surface of the heater tube, and a washing frequency of the heater tube, and a chemical decontamination frequency of the steam generator 74, because of the reduction effect of the suspended solid.

Sixteenth Embodiment

Figure 20:
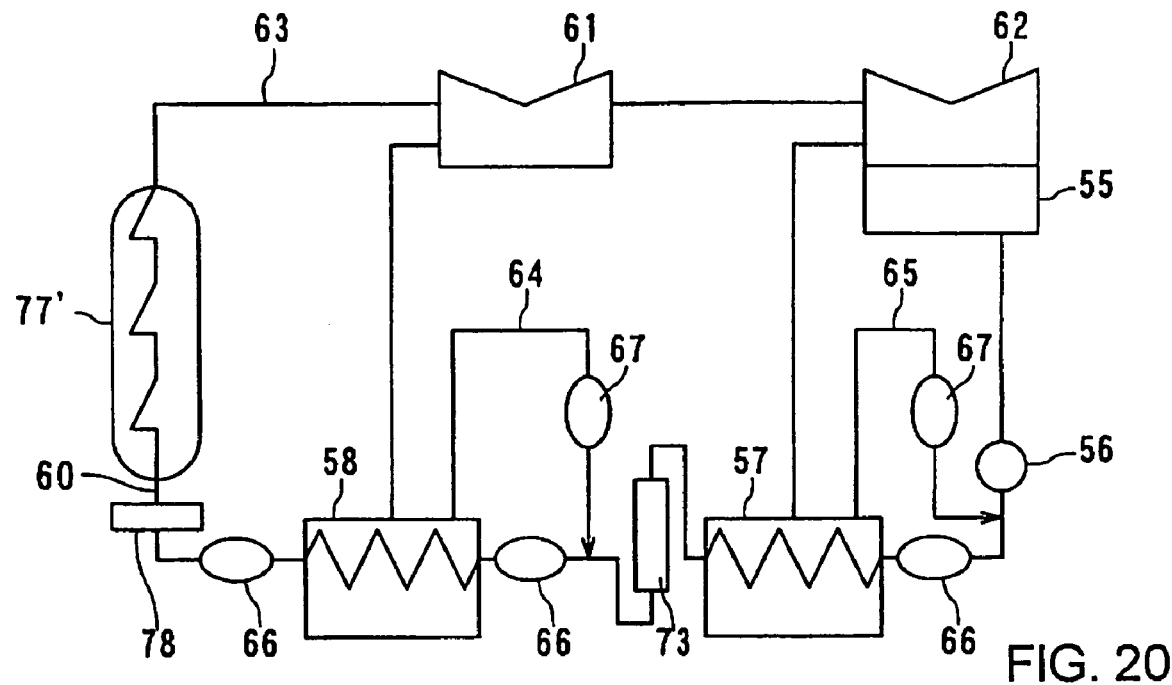
FIG. 20 is a basic block diagram showing a power plant, which is a example of installing a filtering apparatus of any of the above-mentioned first through ninth embodiment in a thermal power plant.

FIG. 20 is a basic block diagram showing a power plant, which is a example of installing a filtering apparatus of any of the above-mentioned first through ninth embodiment in a thermal power plant.

As shown in FIG. 20, the power plant of this embodiment is equipped with a feedwater line 60 in which feedwater flows from a condenser-55 to an evaporator 77 through a condensate deminelarizer equipment 56, a low pressure heater 57, a fuel economizer 78, and a high pressure heater 58. The fuel economizer 78 collects residual oxygen to be reused.

Moreover, the power plant of this embodiment is equipped a main steam line 63 from the evaporator 77 to the high pressure turbine 61 and the low pressure turbine 62, and a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

In this thermal power plant of this embodiment, two or more feedwater filtering apparatuses 66 of any of the above-mentioned first through ninth embodiments are installed on the feedwater line 60 between the condenser 55 and the nuclear reactor pressure vessel 72 through the condensate deminelarizer equipment 56, the low pressure heater 57 and the high pressure heater 58.

That is, in the feedwater line 60, these feedwater filtering apparatuses 68 are installed on the inlet side of the low pressure heater 57 and the inlet side and the outlet side of the high pressure heater 58, respectively.

Moreover, in the thermal power plant of this embodiment, heater drain filtering apparatuses 67 of any of the above-mentioned first through ninth embodiments are installed on a high pressure heater drain line 64 introduced from the high pressure turbine 61 to the feedwater line 60 through the high pressure heater 58 and a low pressure heater drain line 65 introduced from the low pressure turbine 62 to the feedwater line 60 through the low pressure heater 57, respectively.

According to this embodiment, by installing the feedwater filtering apparatuses 66 on the inlet side of the low pressure heater 57 and the inlet side and the outlet side of the high pressure heater 58, respectively, and installing the heater drain filtering apparatuses 67 on the heater drain lines 64, 65, respectively, suspended solid contained in the feedwater and the heater drain can be reduced, and it makes possible to reduce erosion inside of piping, prevention of heat transmission caused by adhering the suspended solid to the surface of the heater tube, because of the reduction effect of the suspended solid, and a washing period-before starting the thermal power plant can be shortened.

Moreover, this invention is not limited the above-mentioned embodiments and several change of the embodiments can be considered. For example, in, from the fourteenth to the sixteenth embodiments, it explains there are filtering apparatuses in both feedwater line 60 and the heater drain lines 64, 65, however, it is possible that the filtering apparatuses installed in either one line.

Furthermore, in from the tenth embodiment to the sixteenth embodiment for applying the filtering apparatus or device mentioned any of from the first embodiment to the ninth embodiment to the power plant, it may install the filtering apparatus or device having the filter module heated in or permeated with hot fluid by using a treatment equipment such as one shown in FIG. 4. And it is also possible that after installing the filtering apparatus or device in the power plant the thermal treatment or thermal filtration process is carried out toward the filter module in the filtering apparatus or module.

According to this invention, a filtering device can be made durable in hot water, and suspended solid contained in hot water can be removed certainly. As a result, water quality of filtrate can be kept adequate.

According to this invention, by adding thermal treatment to a fluororesin filter at a temperature of less than the melting point of the fluororesin before the use, elution from the filter can be reduced and the control water quality can be satisfied, and it can prevent damage of the filter due to heat cycle and lowering of permeability previously.

According to this invention, in the back wash operation for removing suspended solid contained in water, such as low temperature condensate, hot feedwater, and heater drain, it makes possible to simplify the back wash operation to avoid the filter being hydrophobic without process to make the filter hydrophilic.

Furthermore, according to this invention, suspended solid in the feedwater or the heater drain can be reduced and it makes possible to reduce erosion inside of piping, prevention of heat transmission caused by adhering the suspended solid to the surface of the heater tube, and a washing frequency of the heater tube, because of the reduction effect of the suspended solid. And the suspended solid in hot water, such as feedwater and heater drain, can be removed with keeping stable permeability, without polluting water quality.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention.

What is claimed is:

1. A filtering apparatus, comprising:
a vessel adapted for connecting a feed inlet line for introducing feed into the vessel and a filtrate outlet line for letting filtrate out of the vessel;
a filter contained in the vessel for filtering the feed to let filtered feed flow as the filtrate; and
the filter being made of fluororesin to which thermal treatment is added in at least one of gas and liquid beforehand,
wherein the filter is further permeated with permeation fluid composed of one of hot water and steam beforehand, and
wherein:
the filter is permeated with the permeation fluid at a temperature of between 100 and 250 degrees Centigrade for not less than one hour.

2. The filtering apparatus as recited in claim 1, wherein:
the filter is kept in a circumstance at a temperature of between 100 and 250 degrees Centigrade for not less than one hour beforehand.

3. The filtering apparatus as recited in claim 1, wherein:
the filter is formed in one of hollow shape, a shape of pleats, a flat film, and a tube.

4. The filtering apparatus as recited in claim 1, further comprising at least one of:
a back wash equipment for back washing the filter to remove suspended solid adhered to a surface of the filter; and
a chemical cleaning equipment for cleaning the filter with chemicals.

5. A filtering apparatus, comprising:
a vessel adapted for connecting a feed inlet line for introducing feed into the vessel and a filtrate outlet line for letting filtrate out of the vessel;
a filter contained in the vessel for filtering the feed to let filtered feed flow as the filtrate; and
the filter being made of fluororesin to which thermal treatment is added in at least one of gas and liquid beforehand,
wherein the filter is composed of:
a plurality of hollow porosity films composed of a first one of the fluororesin; and
a support portion composed of a second one of the fluororesin with a melting point less than that of the first one of the fluororesin jointed at edges of the hollow porosity films.

6. The filtering apparatus as recited in claim 5, wherein:
the filter is further permeated with permeation fluid composed of one of hot water and steam beforehand.

7. The filtering apparatus as recited in claim 5, wherein:
the filter is kept in a circumstance at a temperature of between 100 and 250 degrees Centigrade for not less than one hour beforehand.

8. The filtering apparatus as recited in claim 5, wherein:
the filter is formed in one of hollow shape, a shape of pleats, a flat film, and a tube.

9. The filtering apparatus as recited in claim 5, further comprising at least one of:
a back wash equipment for back washing the filter to remove suspended solid adhered to a surface of the filter; and
a chemical cleaning equipment for cleaning the filter with chemicals.

10. A filtering apparatus, comprising:
a vessel adapted for connecting a feed inlet line for introducing feed into the vessel and a filtrate outlet line for letting filtrate out of the vessel;
a filter contained in the vessel for filtering the feed to let filtered feed flow as the filtrate; and
the filter being made of fluororesin to which thermal treatment is added in at least one of gas and liquid beforehand,
wherein the filter is composed of:
a plurality of hollow porosity films composed of a first one of the fluororesin;
a support portion composed of a second one of the fluororesin jointed at edges of the hollow porosity films; and
a seal portion composed of a third one of the fluororesin with a melting point less than that of the first and second ones jointed between the hollow porosity films and the support portion.

11. The filtering apparatus as recited in claim 10, wherein:
the filter is kept in a circumstance at a temperature of between 100 and 250 degrees Centigrade for not less than one hour beforehand.

12. The filtering apparatus as recited in claim 11, wherein:
the filter is further permeated with permeation fluid composed of one of hot water and steam beforehand.

13. The filtering apparatus as recited in claim 11, wherein:
the filter is formed in one of hollow shape, a shape of pleats, a flat film, and a tube.

14. The filtering apparatus as recited in claim 11, further comprising at least one of:
a back wash equipment for back washing the filter to remove suspended solid adhered to a surface of the filter; and
a chemical cleaning equipment for cleaning the filter with chemicals.

15. A filtering apparatus, comprising:
a vessel adapted for connecting a feed inlet line for introducing feed into the vessel and a filtrate outlet line for letting filtrate flow out of the vessel; and
a filter contained in the vessel for filtering the feed to let filtered feed flow as the filtrate;
the filter being made of fluororesin permeated with permeation fluid composed of at least one of hot water and steam beforehand;
wherein the filter is permeated with the permeation fluid at a temperature of between 100 and 250 degrees Centigrade for not less than one hour; and
wherein the permeation fluid is hot water simulating water of a power plant concerning at least one of pH value, concentration of dissolving oxygen, and chemicals component.

16. A power plant, comprising:

a steam generator for generating steam from feedwater;

a turbine driven by the steam supplied from the steam generator;

a condenser for condensing the steam extracted from the turbine into condensate;

a feedwater line for supplying the condensate from the condenser to the steam generator as the feedwater;

a heater for heating the feedwater flowing in the feedwater line;

a heater drain line for supplying drain discharged from the heater to the feedwater line; and a filtering apparatus installed in at least one of the feedwater line and the heater drain line, the filtering apparatus comprising:

a vessel adapted for connecting a feed inlet line for introducing feed into the vessel and a filtrate outlet line for letting filtrate out of the vessel;

a filter contained in the vessel for filtering the feed to let filtered feed flow as the filtrate; and the filter being made of fluororesin to which thermal treatment is added in at least one of gas and liquid beforehand.

17. A power plant, comprising:

a steam generator for generating steam from feedwater;

a turbine driven by the steam supplied from the steam generator;

a condenser for condensing the steam extracted from the turbine into condensate;

a feedwater line for supplying the condensate from the condenser to the steam generator as the feedwater;

a heater for heating the feedwater flowing in the feedwater line;

a heater drain line for supplying drain discharged from the heater to the feedwater line; and a filtering apparatus installed in at least one of the feedwater line and the heater drain line, the filtering apparatus comprising:

a vessel adapted for connecting a feed inlet line for introducing feed into the vessel and a filtrate outlet line for letting filtrate out of the vessel;

a filter contained in the vessel for filtering the feed to let filtered feed flow as the filtrate; and the filter being made of fluororesin permeated with permeation fluid composed of at least one of hot water and steam beforehand.

* * * * *